US012334288B2

(12) United States Patent
Springer et al.

(10) Patent No.: US 12,334,288 B2
(45) **Date of Patent: *Jun. 17, 2025**

(54) DUAL COIL ELECTRIC HEATING ELEMENT

(71) Applicants: Backer EHP Inc., Murfreesboro, TN (US); Wako (USA) Inc., Louisville, KY (US)

(72) Inventors: Stacy Springer, Murfreesboro, TN (US); Dan Maxwell, Murfreesboro, TN (US); Zachary Newcomb, Louisville, KY (US); Shahid Ikram, Goshen, KY (US); Mitch Taylor, Prospect, KY (US)

(73) Assignees: Backer EHP Inc., Murfreesboro, TN (US); Wako (USA) Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,905

(22) Filed: Mar. 8, 2024

(65) Prior Publication Data

US 2024/0212962 A1 Jun. 27, 2024

Related U.S. Application Data

(63) Continuation of application No. 18/168,344, filed on Feb. 13, 2023, now Pat. No. 11,929,220, which is a (Continued)

(51) Int. Cl.

*H01H 37/54* (2006.01)
*H05B 1/02* (2006.01)
*H01H 37/70* (2006.01)

(52) U.S. Cl.

CPC ....... *H01H 37/5409* (2013.01); *H05B 1/0266* (2013.01); *H01H 2037/705* (2013.01)

(58) Field of Classification Search

CPC ......... H01H 37/5409; H01H 2037/705; H05B 1/0266

See application file for complete search history.

(56) References Cited

U.S. PATENT DOCUMENTS 2,140,479 A 12/1938 Myers et al.
2,260,165 A 10/1941 Calhoun (Continued)

FOREIGN PATENT DOCUMENTS

CA 2970348 12/2017
DE 3510398 9/1986

(Continued)

OTHER PUBLICATIONS

GE Range 6" Surface Burner WB30X359; found at Central Appliance Parts: http:/f.centralapplianceparts.com/GE-Range-6-Inch-Surface-Burner-WB30X359-p/wb30x359htm in Examiner's search of WB30X359 surface burner at Central Appliance Parts site on Nov. 29, 2012.

(Continued)

*Primary Examiner* — Jacob R Crum
(74) *Attorney, Agent, or Firm* — Crowell & Moring LLP; Thomas E. Williams

(57) ABSTRACT

An embodiment of an electric heating element is disclosed, including an electrically resistive inner heating element, an electrically resistive outer heating element, and a thermostat positioned underneath a centrally-positioned medallion and along a cold leg of the inner heating element. The thermostat is configured to selectively allow electrical current to be delivered to the inner heating element while maximum electrical current, for example, continues to be provided to the outer heating element. The thermostat cycles the electrical current on and off when detecting maximum and minimum desired temperatures radiated from the electric heating element. The inner heating element has a pair of cold (Continued)

legs that extend parallel to a pair of cold legs of the outer heating element, some or all of which may be supported by a terminal bracket.

20 Claims, 15 Drawing Sheets

Related U.S. Application Data continuation of application No. 16/682,757, filed on Nov. 13, 2019, now Pat. No. 11,581,156, which is a continuation-in-part of application No. 29/697,023, filed on Jul. 3, 2019, now Pat. No. Des. 955,168.

(56) References Cited

U.S. PATENT DOCUMENTS

| | | | |
|---|---|---|---|
| D132,279 | S | 5/1942 | Mccormick |
| 2,375,058 | A | 5/1945 | Wiegand |
| 2,399,423 | A | 4/1946 | Bletz |
| 2,413,477 | A | 12/1946 | Wiegand |
| 2,413,478 | A | 12/1946 | Wiegand |
| 2,418,520 | A | 4/1947 | Morton |
| 2,428,899 | A | 10/1947 | Wiegand |
| 2,428,900 | A | 10/1947 | Wiegand |
| 2,442,659 | A | 6/1948 | McCormick |
| 2,462,016 | A | 2/1949 | Wiegand |
| 2,467,348 | A | 4/1949 | Tuttle |
| 2,472,738 | A | 6/1949 | Backer |
| 2,550,843 | A | 5/1951 | McOrlly |
| 2,565,432 | A | 8/1951 | Kirk |
| 2,602,132 | A | 7/1952 | Young |
| 2,678,379 | A | 5/1954 | Fry |
| 2,689,903 | A | 9/1954 | Radley |
| 2,725,456 | A | 11/1955 | Weyrick |
| 2,751,487 | A | 6/1956 | Vallorani et al. |
| 2,754,405 | A | 7/1956 | Fry |
| 2,764,661 | A | 9/1956 | Molyneaux |
| 2,764,665 | A | 9/1956 | Walkoe |
| 2,781,038 | A | 2/1957 | Sherman |
| 2,790,062 | A | 4/1957 | McOrlly |
| 2,806,122 | A | 9/1957 | Thunander |
| 2,877,334 | A | 3/1959 | McOrlly et al. |
| 2,880,614 | A | 4/1959 | Reiter |
| 2,883,507 | A | 4/1959 | Lewis et al. |
| 2,933,805 | A | 4/1960 | McOrlly |
| 2,943,178 | A | 6/1960 | Aldous |
| 2,955,189 | A | 10/1960 | Fry |
| 2,988,625 | A | 6/1961 | Hart |
| 2,994,758 | A | 8/1961 | Kelly |
| 2,999,144 | A | 9/1961 | Carissimi |
| 3,016,445 | A | 1/1962 | Lien, Jr. |
| 3,017,491 | A | 1/1962 | Ammerman |
| 3,021,414 | A | 2/1962 | Sand |
| 3,041,437 | A | 6/1962 | Carissimi |
| 3,042,785 | A | 7/1962 | Hanson |
| 3,056,012 | A | 9/1962 | Hanson |
| 3,068,340 | A | 12/1962 | Bremer et al. |
| 3,072,775 | A | 1/1963 | Ammerman et al. |
| 3,083,287 | A | 3/1963 | Clapp |
| 3,107,288 | A | 10/1963 | Mertler |
| 3,118,044 | A | 1/1964 | Holtkamp |
| 3,124,673 | A | 3/1964 | Yohe |
| 3,134,887 | A | 5/1964 | Hanson |
| 3,155,815 | A | 11/1964 | Clapp |
| 3,171,949 | A | 3/1965 | McOrlly |
| 3,174,028 | A | 3/1965 | Ammerman |
| 3,188,449 | A | 6/1965 | Hanson |
| 3,192,361 | A | 6/1965 | Post et al. |
| 3,246,122 | A | 4/1966 | Wetzel |
| 3,246,123 | A | 4/1966 | Ammerman et al. |
| 3,258,580 | A | 6/1966 | Dills |
| 3,327,966 | A | 6/1967 | Jasionowski |
| 3,328,562 | A | 6/1967 | Jasionowski |
| 3,331,944 | A | 7/1967 | Burger et al. |
| 3,336,466 | A | 8/1967 | Cunningham |
| 3,350,674 | A | 10/1967 | Kozbelt et al. |
| 3,384,736 | A | 5/1968 | Nowosielski |
| 3,466,426 | A | 9/1969 | Kefauver, Jr. |
| 3,466,427 | A | 9/1969 | Burger |
| 3,506,805 | A | 4/1970 | Sauder |
| 3,644,710 | A | 2/1972 | Drugmand et al. |
| 3,674,983 | A | 7/1972 | Hurko et al. |
| 3,696,232 | A | 10/1972 | Salinger |
| 3,767,897 | A | 10/1973 | Prucha et al. |
| 3,781,757 | A | 12/1973 | Barnes |
| 4,013,870 | A | 3/1977 | Summers |
| 4,051,346 | A | 9/1977 | Lenmark |
| 4,122,330 | A | 10/1978 | Fischer |
| 4,146,865 | A | 3/1979 | Scharbach et al. |
| 4,214,150 | A | 7/1980 | Cunningham |
| 4,237,368 | A | 12/1980 | Welch |
| 4,241,289 | A | 12/1980 | Bowling |
| 4,330,701 | A | 5/1982 | Fischer et al. |
| 4,381,444 | A | 4/1983 | DeLong et al. |
| 4,388,518 | A | 6/1983 | Willbanks et al. |
| 4,394,564 | A | 7/1983 | Dills |
| 4,399,351 | A | 8/1983 | Koff |
| 4,410,793 | A | 10/1983 | Fischer et al. |
| 4,431,908 | A | 2/1984 | Fischer et al. |
| 4,435,638 | A | 3/1984 | Simon et al. |
| 4,538,051 | A | 8/1985 | Schreder et al. |
| 4,634,841 | A | 1/1987 | Laughrey |
| 4,710,611 | A | 12/1987 | Axelson |
| 4,740,664 | A | 4/1988 | Payne |
| 4,770,545 | A | 9/1988 | Takada et al. |
| 4,812,624 | A | 3/1989 | Kern |
| 4,812,625 | A | 3/1989 | Ceste, Sr. |
| 4,906,819 | A | 3/1990 | Thompson et al. |
| 4,974,804 | A | 12/1990 | Thompson et al. |
| 5,136,142 | A | 8/1992 | Logan |
| 5,153,414 | A | 10/1992 | Wilson et al. |
| 5,176,451 | A | 1/1993 | Sasada et al. |
| 5,227,611 | A | 7/1993 | Allatt et al. |
| 5,270,519 | A | 12/1993 | Higgins |
| 5,294,778 | A | 3/1994 | Carman et al. |
| 5,294,779 | A | 3/1994 | Miquelot |
| 5,347,609 | A | 9/1994 | Huff |
| 5,396,047 | A | 3/1995 | Schilling et al. |
| 5,410,128 | A | 4/1995 | Vermillion et al. |
| 5,498,854 | A | 3/1996 | McWilliams |
| 5,658,478 | A | 8/1997 | Roeschel et al. |
| 5,796,346 | A | 8/1998 | Wash et al. |
| D402,156 | S | 12/1998 | Meyer |
| 5,852,282 | A | 12/1998 | Moore et al. |
| 5,856,654 | A | 1/1999 | Frasnetti et al. |
| 5,928,543 | A | 7/1999 | Davis et al. |
| 5,945,017 | A | 8/1999 | Cheng et al. |
| 5,951,898 | A | 9/1999 | Bailleul et al. |
| 5,961,867 | A | 10/1999 | McWilliams |
| 6,049,068 | A | 4/2000 | Logan |
| 6,104,005 | A | 8/2000 | Adamski et al. |
| 6,133,552 | A | 10/2000 | Saulnier et al. |
| 6,246,033 | B1 | 6/2001 | Shah |
| 6,300,605 | B1 | 10/2001 | Higgins |
| 6,417,496 | B1 | 7/2002 | Bates et al. |
| D468,963 | S | 1/2003 | Pai |
| 6,555,793 | B2 | 4/2003 | Griffiths et al. |
| 6,663,009 | B1 | 12/2003 | Bedetti et al. |
| 6,693,262 | B2 | 2/2004 | Gerola et al. |
| 7,053,340 | B2 | 5/2006 | Wilde et al. |
| 7,255,100 | B2 | 8/2007 | Repper et al. |
| 7,268,324 | B2 | 9/2007 | Liebold et al. |
| 7,307,246 | B2 | 12/2007 | Smolenski et al. |
| D625,558 | S | 10/2010 | Griffith |
| 7,928,344 | B2 | 4/2011 | Jeong |
| D638,927 | S | 5/2011 | Kidane |
| RE42,513 | E | 7/2011 | Clothier |
| 8,001,957 | B2 | 8/2011 | Clauss et al. |
| 8,274,020 | B2 | 9/2012 | Donarski et al. |
| 8,344,292 | B2 | 1/2013 | Franca et al. |
| 8,723,085 | B2 | 5/2014 | Callahan et al. |
| 8,895,903 | B2 | 11/2014 | de los Toyos Lopez et al. |
| 9,132,302 | B2 | 9/2015 | Luongo et al. |

(56) References Cited

U.S. PATENT DOCUMENTS

| | | | |
|---|---|---|---|
| 9,220,130 B1 | 12/2015 | Smith | |
| 9,894,716 B2 | 2/2018 | Mohr | |
| 10,018,514 B2 | 7/2018 | Jewell et al. | |
| 10,024,546 B2 | 7/2018 | Smith et al. | |
| 10,132,504 B1 | 11/2018 | Springer et al. | |
| D835,940 S | 12/2018 | Krishnan | |
| 10,222,070 B2 | 3/2019 | Cadima | |
| 10,251,218 B2 | 4/2019 | Gomez et al. | |
| 10,408,462 B2 | 9/2019 | Smith et al. | |
| 10,429,079 B2 | 10/2019 | Pasqual et al. | |
| 10,429,080 B2 | 10/2019 | Pasqual et al. | |
| 10,440,778 B2 | 10/2019 | Dolinski et al. | |
| 10,499,459 B2 | 12/2019 | Gomez | |
| 10,517,144 B2 | 12/2019 | Gomez | |
| 10,571,133 B1 | 2/2020 | Smith et al. | |
| 10,584,882 B2 | 3/2020 | Iordanoglou | |
| 10,962,232 B2 | 3/2021 | Pasqual et al. | |
| 11,067,288 B2 | 7/2021 | Springer et al. | |
| 11,287,139 B2 | 3/2022 | Xu et al. | |
| 11,506,399 B2 | 11/2022 | Pasqual et al. | |
| 2002/0011480 A1 | 1/2002 | Schilling et al. | |
| 2002/0113057 A1 | 8/2002 | Lerner | |
| 2002/0175213 A1 | 11/2002 | Wodeslavsky | |
| 2004/0099652 A1 | 5/2004 | Berkcan et al. | |
| 2004/0164061 A1 | 8/2004 | Takeuchi et al. | |
| 2004/0164067 A1 | 8/2004 | Badami et al. | |
| 2005/0089809 A9 | 4/2005 | Repper et al. | |
| 2005/0274710 A1 | 12/2005 | Toyos et al. | |
| 2006/0151464 A1* | 7/2006 | Wilson | A47J 37/1261 219/439 |
| 2006/0186112 A1 | 8/2006 | Valiyambath Krishnan et al. | |
| 2007/0170169 A1 | 7/2007 | Jeong | |
| 2011/0068094 A1 | 3/2011 | Pan | |
| 2012/0125912 A1 | 5/2012 | Callahan et al. | |
| 2012/0237647 A1 | 9/2012 | Dobert et al. | |
| 2015/0233770 A1 | 8/2015 | Jewell et al. | |
| 2015/0265089 A1 | 9/2015 | Palazuelos | |
| 2016/0010873 A1 | 1/2016 | Palazuelos | |
| 2016/0316519 A1 | 10/2016 | Gomez et al. | |
| 2017/0089589 A1 | 3/2017 | Lamasanu et al. | |
| 2017/0325293 A1 | 11/2017 | Bach et al. | |
| 2017/0356658 A1 | 12/2017 | Smith et al. | |
| 2017/0359861 A1 | 12/2017 | Smith et al. | |
| 2018/0087777 A1* | 3/2018 | Gomez | F24C 7/083 |
| 2018/0124869 A1 | 5/2018 | Gomez | |
| 2018/0238557 A1 | 8/2018 | Pasqual et al. | |
| 2018/0238558 A1 | 8/2018 | Pasqual et al. | |
| 2018/0238559 A1 | 8/2018 | Pasqual et al. | |
| 2018/0328592 A1 | 11/2018 | Springer et al. | |
| 2019/0078792 A1 | 3/2019 | Springer et al. | |
| 2019/0086098 A1 | 3/2019 | Springer et al. | |
| 2019/0186752 A1 | 6/2019 | Bai | |
| 2019/0346147 A1 | 11/2019 | Smith et al. | |
| 2020/0217517 A1 | 7/2020 | Pasqual et al. | |
| 2021/0317994 A1 | 10/2021 | Pasqual et al. | |
| 2023/0160579 A1 | 5/2023 | Pasqual et al. | |

FOREIGN PATENT DOCUMENTS

| | | |
|---|---|---|
| DE | 3833293 | 4/1989 |
| DE | 29911480 | 9/1999 |
| EP | 223966 | 6/1987 |
| EP | 441364 | 2/1991 |
| EP | 2312218 | 4/2011 |
| FR | 1282084 | 1/1962 |
| GB | 2011769 | 7/1979 |
| GB | 2343352 | 5/2000 |
| JP | S56141527 | 11/1981 |
| JP | S6129645 | 2/1986 |
| JP | H06129645 | 5/1994 |
| JP | H1194258 | 4/1999 |
| JP | 2000283472 | 10/2000 |
| JP | 6129645 | 5/2017 |
| WO | WO 2009011994 | 1/2009 |
| WO | WO 2018154377 | 8/2018 |
| WO | 2019058169 A1 | 3/2019 |

OTHER PUBLICATIONS

GE Range 8 inch Surface Burner WB30X253; dated 2010 retrieved from CentralApplianceParts.com at http://www.centralapplianceparts.com/product/WB30X253/GE_Range_8_Inch_Surface_Burner_WB30X253.aspx[Apr. 25, 2012 1:16:31 PM] in search of GE type stove burner heating element replacement parts on Apr. 25, 2012.

GE Range 8 inch Surface Element WB30T10074; dated 2010 retrieved from CentralApplianceParts.com at http://www.centralapplianceparts.com/product/WB30T10074/GE_Range_8_Inch_Surface_Element_WB30T10074.aspx[Apr. 25, 2012 1:05:31 PM] in search of GE type stove burner heating element replacement parts on Apr. 25, 2012.

International Search Report and Written Opinion mailed Feb. 4, 2019 for PCT Application No. PCT/US2018/060192 (16 pages).

Range Kleen 7381 Replacement Plug-in Range Element by Range Kleen; found at Amazon: http://www.amazon.com/gp/customer/-media/productgallery/BOOOFNJ5RG/ref=cm_ciu_pdp_images_0?ie=UTF8&index=0&isremote=0 in Examiner's search of surface burner elements on Dec. 1, 2012.

Range Surface Elements, [retrieved on Jun. 4, 2010] Retrieved from Emerson Heating Products, Emerson Appliance Solutions, Appliance Parts on-line Catalog # DA-706 using Internet http://www.emersonheating.com/products.html; 10 pages.

Stove/Oven/Range 8" Surface Element—316442301; retrieved from Appliance Zone at http://www.appliancezone.com/ShowProduct.aspx?ID=13710[Apr. 25, 2012 12:16:39 PM] in search using stove burner heating element replacement parts on Apr. 25, 2012.

U.S. Appl. No. 18/168,344, filed Feb. 13, 2023.

U.S. Appl. No. 16/682,757, filed Nov. 13, 2019.

U.S. Appl. No. 29/697,023, filed Jul. 3, 2019.

* cited by examiner

DUAL COIL ELECTRIC HEATING ELEMENT

CROSS REFERENCE TO RELATED APPLICATIONS

This application is a continuation of U.S. application Ser. No. 18/168,344, filed Feb. 13, 2023, which is a continuation of U.S. application Ser. No. 16/682,757, filed Nov. 13, 2019, which is a continuation-in-part of U.S. Design application No. 29/697,023, filed Jul. 3, 2019. All of these applications are incorporated by reference herein in their entirety.

BACKGROUND

Electric heating elements convert electrical energy to heat energy. Stovetop electric heating elements are susceptible to overheating food and liquid thereby creating hazards, including fire hazards. In addition, manufacturers of stovetop electric heating elements must conform to UL 858 Standard for Household Electric Ranges. Thus, there exists a need to effectively and automatically control the temperature of the food and/or liquid being heated by a stovetop electric heating element to ensure that the food and/or liquid are not heated above a desired temperature limit. There also exists a need to retrofit and/or update existing electric stoves, ranges, and cooktops with electric heating elements that conform to the UL 858 standard. There additionally exists a need to be able to retrofit and/or update existing electric stoves, ranges, and cooktops with improved electric heating elements that do not require any adaptors to enable mounting thereto.

SUMMARY

Disclosed are various embodiments of an electric heating element configured to regulate heat applied to food and liquid being heated or cooked thereon. Also disclosed are various embodiments of an electric heating element configured for mounting to a stove, range, or cooktop and the like without an adaptor.

In one embodiment, an electric heating element of the instant disclosure includes an electrically resistive inner heating element, an electrically resistive outer heating element, one or more temperature sensors positioned along a cold leg of the inner heating element, and a controller. The controller is configured to respond to sensor data from the one or more temperature sensors and selectively control the amount of electrical current provided to the inner heating element while maximum electrical current is provided to the outer heating element.

In another embodiment, an electric heating element includes: (1) an electrically resistive inner heating element including an inner coiled heating portion and first and second cold legs extending from and underneath the inner coiled heating portion for connection to an electrical power source; (2) an electrically resistive outer heating element including an outer coiled heating portion positioned in a common plane with and around the inner coiled heating portion, the inner and outer coiled heating portions defining a working surface for receiving a cooking utensil thereon, the outer heating element including third and fourth cold legs extending from and underneath the outer coiled heating portion for connection to the electrical power source, where (i) the first, second, third and fourth cold legs are parallel to the common plane, (ii) the third cold leg is positioned adjacent to and directly above the first cold leg and the second cold leg is positioned between the third and fourth cold legs, (iii) the second cold leg lies along a central plane of the electric heating element that is perpendicular to the common plane, and (iv) the inner heating element is electrically wired in parallel with the outer heating element, where first and second conductors extending from the respective first and second cold legs are electrically joined with respective third and fourth electrical conductors extending from the respective third and fourth electrical conductors, and where the third and fourth electrical conductors are configured for engaging with an appliance electrical receptacle having a single pair of electrical conductor receiving ports; (3) a medallion comprising an uppermost surface and an outermost perimeter wall, the uppermost surface positioned below the working surface, and the outermost perimeter wall positioned inside the inner coiled heating portion; and (4) a switch positioned in electrical series along the second cold leg and laterally under a center of the medallion, the switch configured to selectively open and close an electrical circuit to cycle off and on the inner coiled heating portion while the outer heating element is continuously electrically energized.

The switch may be a thermostat having a bimetal material configured to: (a) open the electrical circuit upon detecting a predetermined high temperature associated with heat emitted from the inner heating element and/or the outer heating element, and (b) close the electrical circuit upon detecting a predetermined low temperature associated with heat emitted from the outer heating element. The electric heating element may include an enclosure for housing the switch. The enclosure may include or be made from a stainless steel. The enclosure may include a top portion and a bottom portion. The top portion may include opposed end walls extending downwardly from a top wall, and the bottom portion may include opposed, slotted end walls and opposed side walls extending upwardly from a bottom wall. Each of the opposed, slotted end walls of the bottom portion may be configured to lie adjacent to respective opposed end walls of the top portion. The opposed end walls of the top portion may each include a circular aperture to receive the second cold leg of the inner coiled heating portion. A top surface of the switch or thermostat may lie against the top wall of the top portion of the enclosure. The medallion may include "L" shaped engagers for rotatably securing the medallion to a heating element support. The third and fourth electrical conductors may include respective third and fourth electrical terminals for engaging with the appliance electrical receptacle having the single pair of electrical conductor receiving ports.

In another embodiment, an electric heating element includes: (1) an electrically resistive inner heating element including an inner coiled heating portion and first and second cold legs extending from the inner coiled heating portion for connection to an electrical power source; (2) an electrically resistive outer heating element including an outer coiled heating portion positioned in a common plane with and around the inner coiled heating portion, the inner and outer coiled heating portions defining a working surface for receiving a cooking utensil thereon, the outer heating element including third and fourth cold legs extending from and underneath the outer coiled heating portion for connection to the electrical power source, where (i) the first, second, third and fourth cold legs are parallel to the common plane and extend radially past an outermost diameter of the outer coiled heating portion, (ii) the third cold leg is positioned adjacent to and directly above the first cold leg and the second cold leg is positioned between the third and fourth cold legs, and (iii) the second cold leg lies along a central plane of the electric heating element that is perpendicular to the common plane; (3) first, second, third, and fourth electrical conductors extending from the first, second, third and fourth cold legs, respectively, where the first electrical conductor is connected to the third electrical conductor and the second electrical conductor is connected to the fourth electrical conductor, and where the third and fourth electrical conductors are configured for engaging with an appliance electrical receptacle having a single pair of electrical conductor receiving ports; (4) a medallion comprising an uppermost surface and an outermost perimeter wall, the uppermost surface positioned below the working surface, and the outermost perimeter wall positioned inside the inner coiled heating portion; and (5) a thermostat positioned in electrical series along the second cold leg in proximity to the inner coiled heating portion, the thermostat positioned along an axis extending through a geometric center of the medallion, the axis oriented perpendicular to the common plane and lying in the central plane, the thermostat configured to detect an upper predetermined temperature and a lower predetermined temperature and selectively open and close an electrical circuit to cycle off and on the inner coiled heating portion while the outer heating element is continuously electrically energized.

The thermostat may include a bimetal material configured to: (a) open the electrical circuit upon detecting a predetermined high temperature associated with heat emitted from the inner heating element and/or the outer heating element, and (b) close the electrical circuit upon detecting a predetermined low temperature associated with heat emitted from the outer heating element. The electric heating element may include an enclosure for housing the thermostat. The enclosure may include or be made from a stainless steel. The enclosure may include a top portion and a bottom portion. The top portion may include opposed end walls extending downwardly from a top wall, and the bottom portion may include opposed, slotted end walls and opposed side walls extending upwardly from a bottom wall. Each of the opposed, slotted end walls of the bottom portion may be configured to lie adjacent to respective opposed end walls of the top portion. The opposed end walls of the top portion may each include a circular aperture to receive the second cold leg of the inner coiled heating portion. A top surface of the thermostat may lie against the top wall of the top portion of the enclosure.

The electric heating element may include a multi-legged bracket configured to support the inner and the outer heating elements. The medallion may include a plurality of "L" shaped engagers to engage with a respective plurality of receivers to secure the medallion to the bracket. The third and fourth electrical conductors may include respective third and fourth electrical terminals for engaging with the appliance electrical receptacle having the single pair of electrical conductor receiving ports.

In another embodiment, an electric heating element includes: (1) an electrically resistive inner heating element including an inner coiled heating portion and first and second cold legs extending from the inner coiled heating portion for connection to an electrical power source; (2) an electrically resistive outer heating element including an outer coiled heating portion positioned in a common plane with and around the inner coiled heating portion, the inner and outer coiled heating portions defining a working surface for receiving a cooking utensil thereon, the outer heating element including third and fourth cold legs extending from the outer coiled heating portion for connection to the electrical power source, where (i) the first, second, third and fourth cold legs are parallel to the common plane and extend radially past an outermost diameter of the outer coiled heating portion, (ii) the third cold leg is positioned adjacent to and directly above the first cold leg and the second cold leg is positioned between the third and fourth cold legs, and (iii) the second cold leg lies along a central plane of the electric heating element that is perpendicular to the common plane; (3) first, second, third, and fourth electrical conductors extending from the first, second, third and fourth cold legs, respectively, where the first electrical conductor is connected to the third electrical conductor and the second electrical conductor is connected to the fourth electrical conductor, and where the third and fourth electrical conductors are configured for engaging with an appliance electrical receptacle having a single pair of electrical conductor receiving ports; (4) a bracket comprising at least three radially extending, spaced apart legs for supporting the inner heating element and the outer heating element; (5) a medallion positioned on the bracket with an uppermost wall of the medallion lying below the working surface and with an outermost perimeter wall of the medallion lying inside an innermost turn of a coiled portion of the inner coiled heating portion; (6) a thermostat housed in an enclosure and configured to selectively switch on and off the inner coiled heating portion while the outer coiled heating portion remains electrically energized, the thermostat positioned in electrical series along the second cold leg under the bracket in proximity to the inner coiled heating portion, the thermostat positioned along an axis extending through a geometric center of the medallion and a geometric center of the bracket, the axis oriented perpendicular to the common plane and lying in the central plane, the thermostat configured to detect an upper predetermined temperature and a lower predetermined temperature and selectively open and close, respectively, an electrical circuit to cycle off and on the inner coiled heating portion while the outer heating element is continuously electrically energized; and (7) a cold leg bracket oriented perpendicularly to the first, second, third, and fourth cold legs and positioned near a terminal end of the first, second, third, and fourth cold legs to restrain the first, second, third, and fourth cold legs near the terminal end.

DETAILED DESCRIPTION

Figure 1:
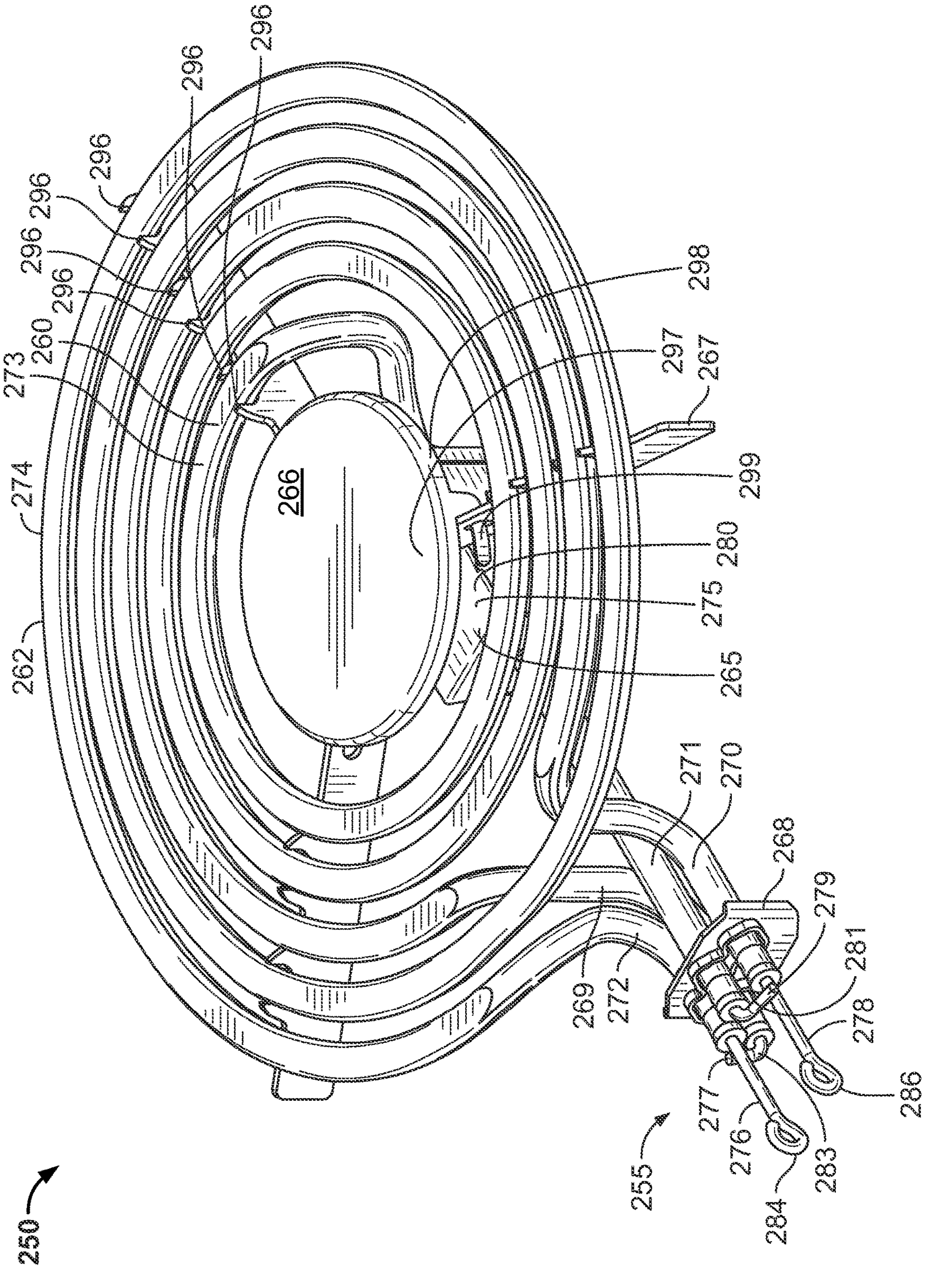
FIG. 1 is a front, top perspective view of an electric heating element of the instant disclosure.

Although the figures and the instant disclosure describe one or more embodiments of a heating element, one of ordinary skill in the art would appreciate that the teachings of the instant disclosure would not be limited to these embodiments. For example, the teachings of the instant disclosure may be applied to controlling the temperature or heat output of any heating element. It should be appreciated that any of the features of an embodiment discussed with reference to the figures herein may be combined with or substituted for features discussed in connection with other embodiments in this disclosure. This application incorporates by reference herein the entire contents of U.S. patent application Ser. Nos. 16/186,383 and 16/195,567.

Turning now to the figures, wherein like reference numerals refer to like elements, there is shown one or more embodiments of an electric heating element. FIGS. 1-14 illustrate an embodiment of a dual coil electric heating element 250 comprising one or more temperature sensors 265, electrically resistive inner heating element 260, electrically resistive outer heating element 262, medallion 266, spider bracket 267, terminal bracket 268, and compact terminal portion 255. Compact terminal portion 255 enables easy interchangeability with conventional heating elements having a twin-terminal design while providing the advantage of increased wattage over a conventional, single coil electric heating element. To enable adaptor-free installation into conventional twin-terminal receptacles, compact terminal portion 255 of electric heating element 250 conveniently bundles respective inner and outer positive and negative terminals together to form a single pair of terminals for insertion into a conventional two-terminal heating element receptacle. Electric heating element 250 includes the added advantage of arranging temperature sensor 265 centrally, when viewing a top plan view of electric heating element 250, below medallion 266, below spider bracket 267, and below but in proximity to coiled portions 273,274, to provide maximum lateral and vertical clearance between temperature sensor 265 and a drip pan. During operation when heating elements 260,262 are energized at the same time, electric heating element 250 provides increased heat output over a conventional, single coil design.

Figure 6:
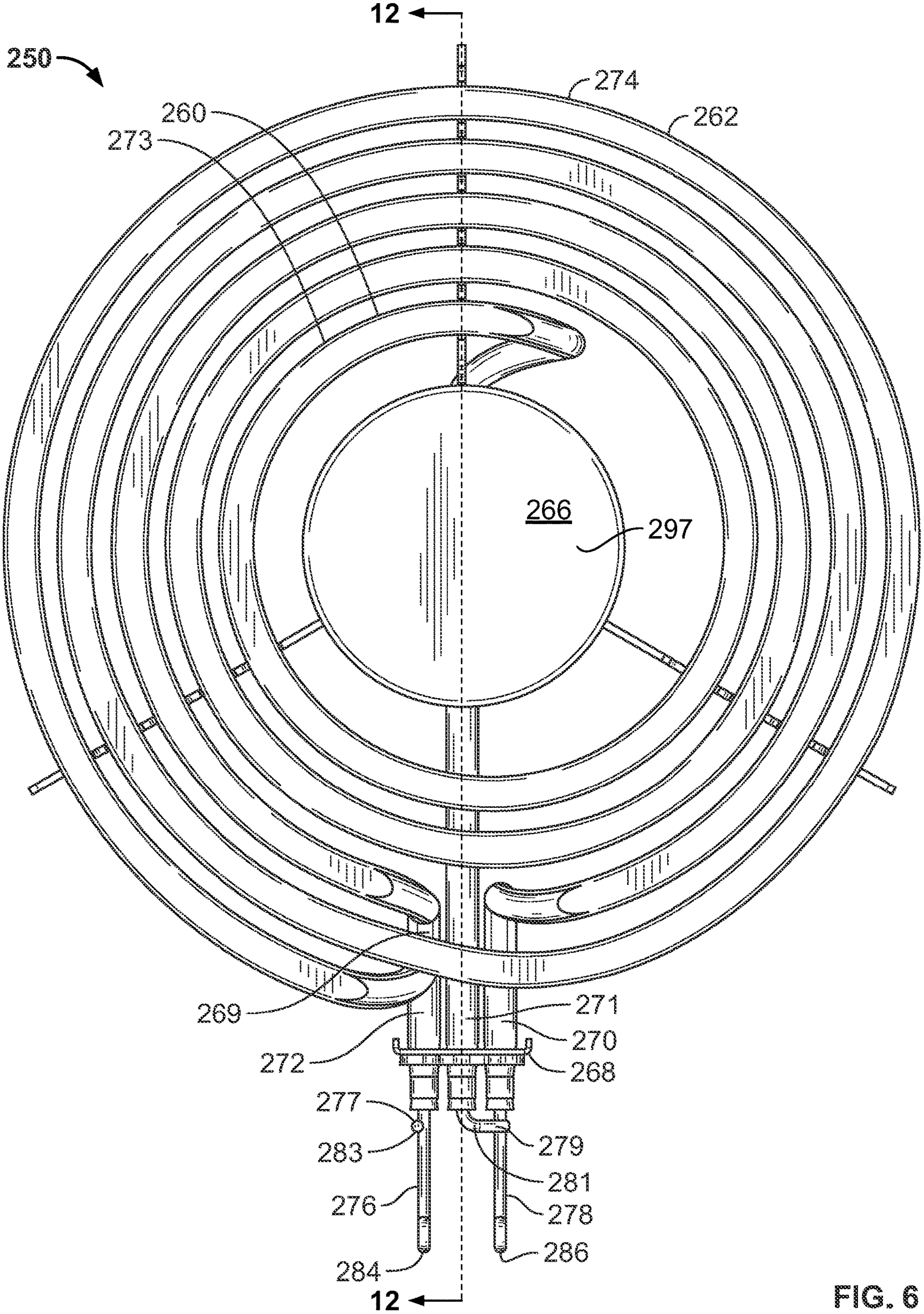
FIG. 6 is a top plan view thereof.
Figure 7:
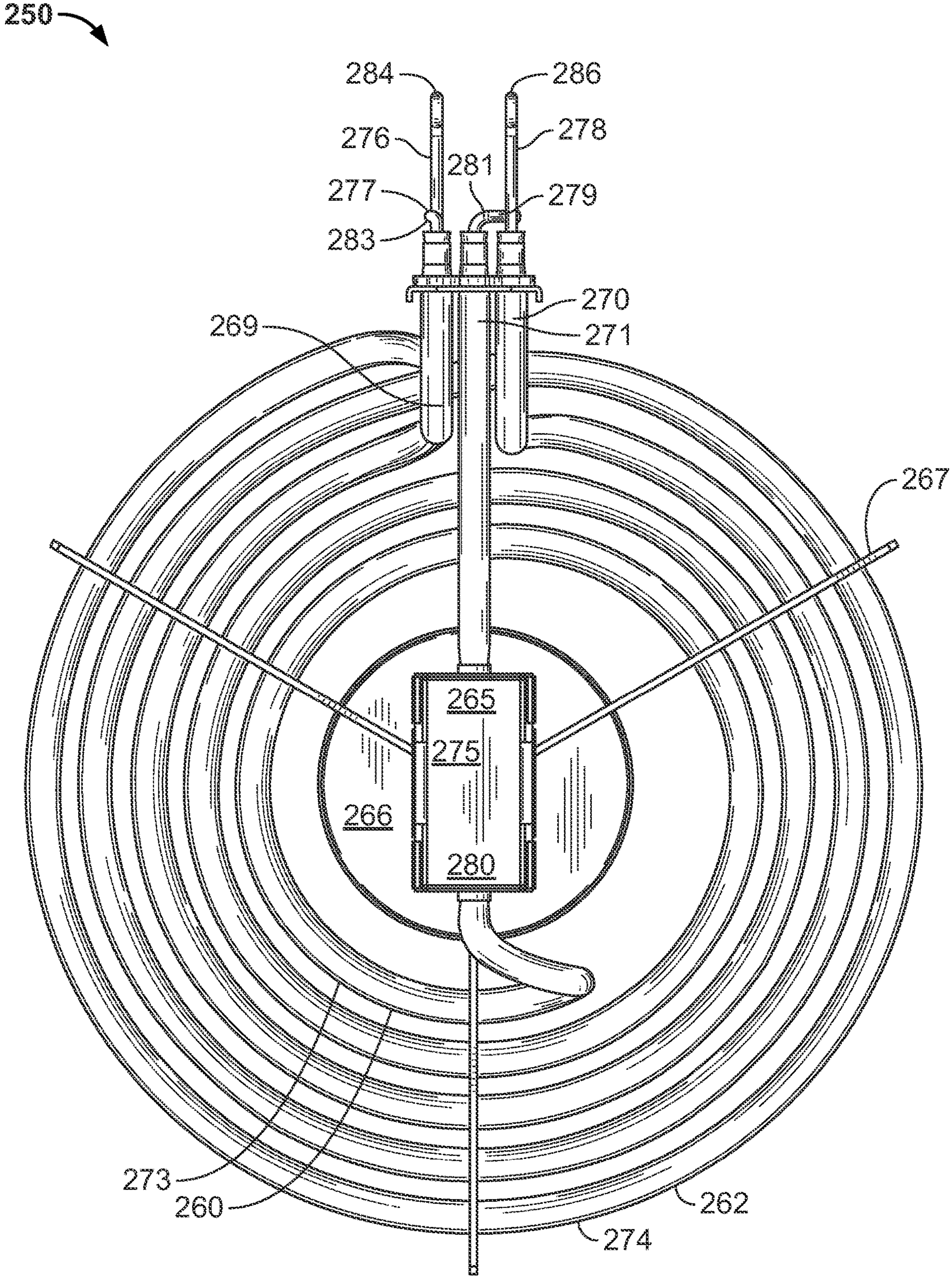
FIG. 7 is a bottom plan view thereof.
Figure 8:
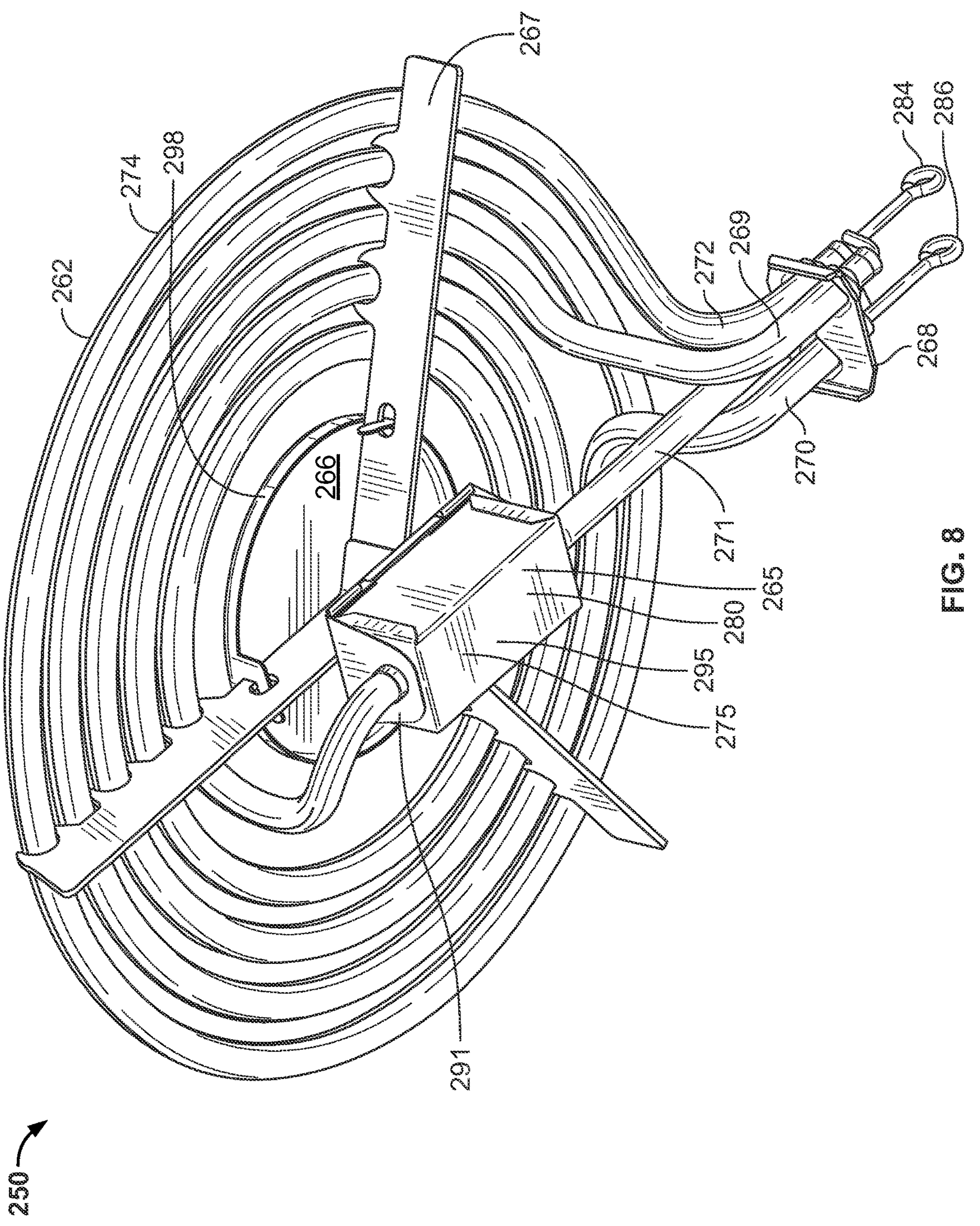
FIG. 8 is a rear, bottom perspective view thereof.
Figure 9:
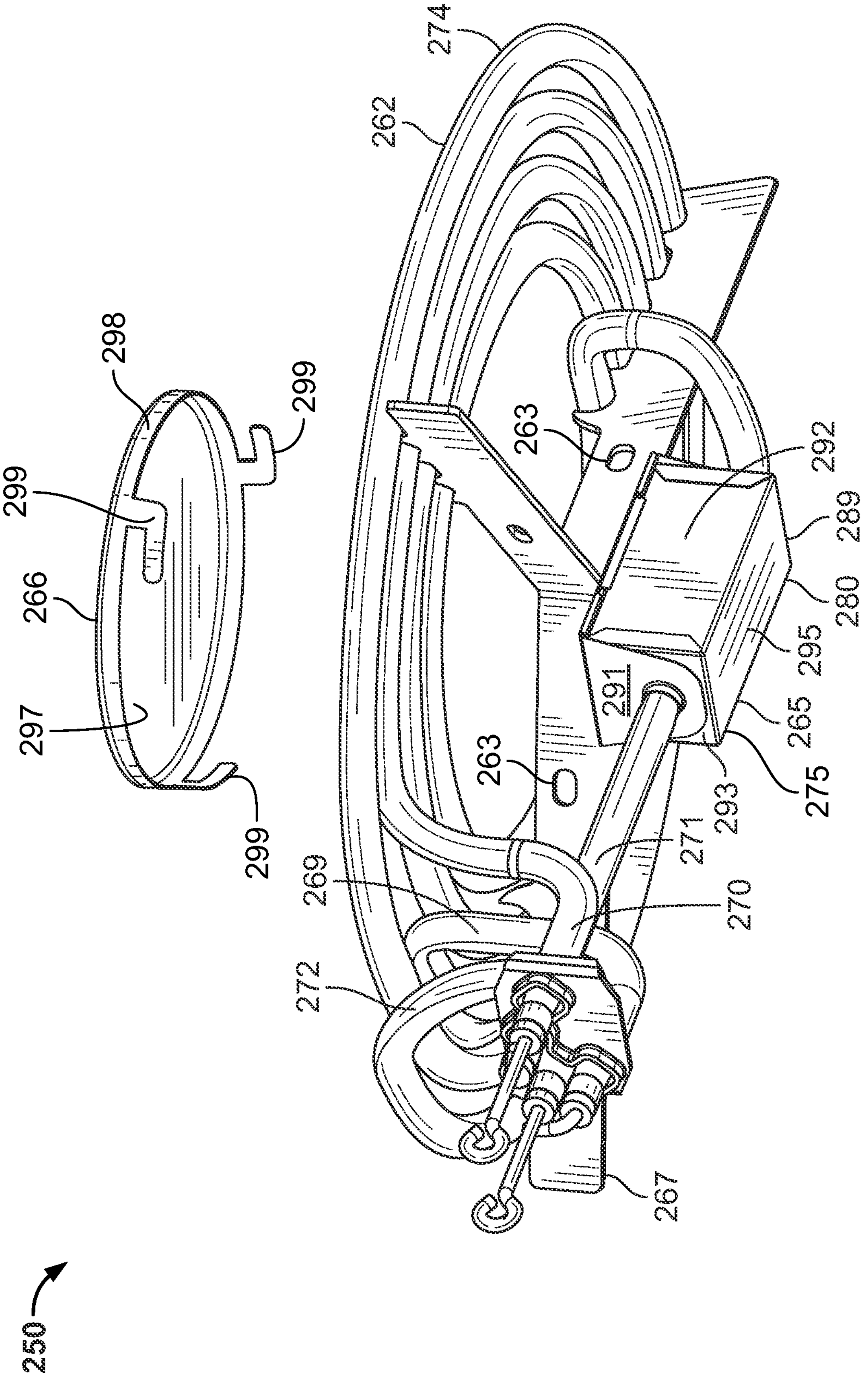
FIG. 9 is a partially exploded, front, bottom perspective view thereof.

Inner heating element 260 includes cold leg 269, cold leg 271, and coiled portion 273. Outer heating element 262 includes cold leg 270, cold leg 272, and coiled portion 274. The respective cold legs 269,270,271,272 are configured to not generate heat when the respective heating elements 260,262 are electrically energized. The respective coiled portions 273,274 are configured to generate heat when the respective heating elements 260,262 are electrically energized. The respective coiled portions 273,274 of the respective heating elements 260,262 lie in the same plane and in a generally concentric, counterclockwise spiral around a common center. More specifically, the coiled portion 274 of outer heating element 262 lies in a generally concentric, counterclockwise spiral around the coiled portion 273 of the inner heating element 260, and coiled portion 273 of the inner heating element 260 lies in a generally concentric, counterclockwise spiral around a center location that is common to both the outer heating element 262 and the inner heating element 260. In other embodiments, the coiled portions 273,274 may lie in a generally clockwise arrangement. Although the coiled portions 273,274 of the respective heating elements 260,262 lie in the same plane and in a generally concentric, counterclockwise spiral around a common geometric center with one another, the common center is slightly offset from the geometric center of the medallion 266 and of the spider bracket 267 viewed from the top as shown in FIG. 6. The slightly offset positioning of the respective geometric centers is caused by the spiral nature of the coiled portions 273,274 and allows visually balanced, generally central positioning of the inner and outer coiled portions 273,274 over the spider bracket 267 and the cold leg 271 when viewed from the top.

Figure 2:
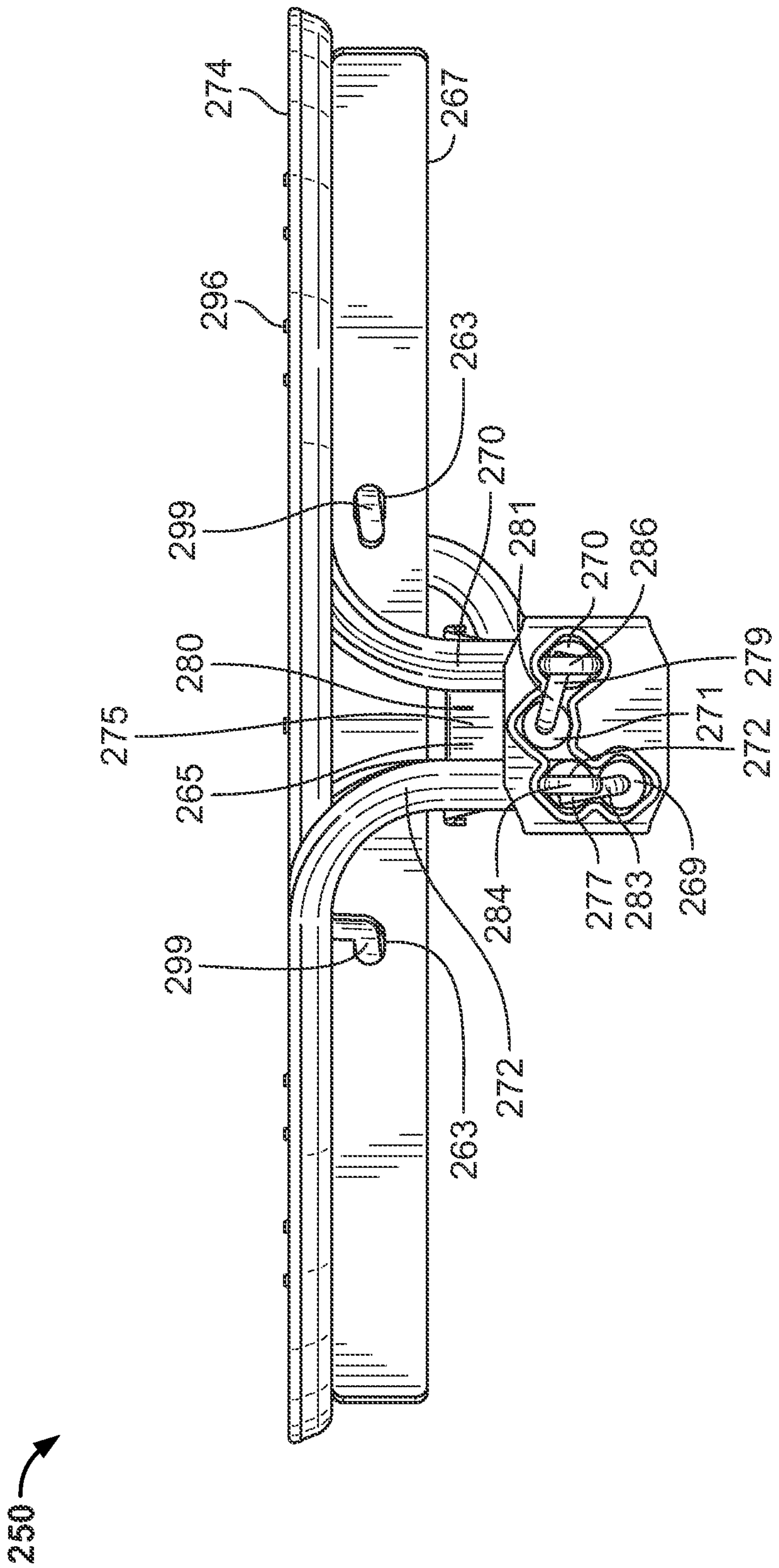
FIG. 2 is a front elevation view thereof.
Figure 3:
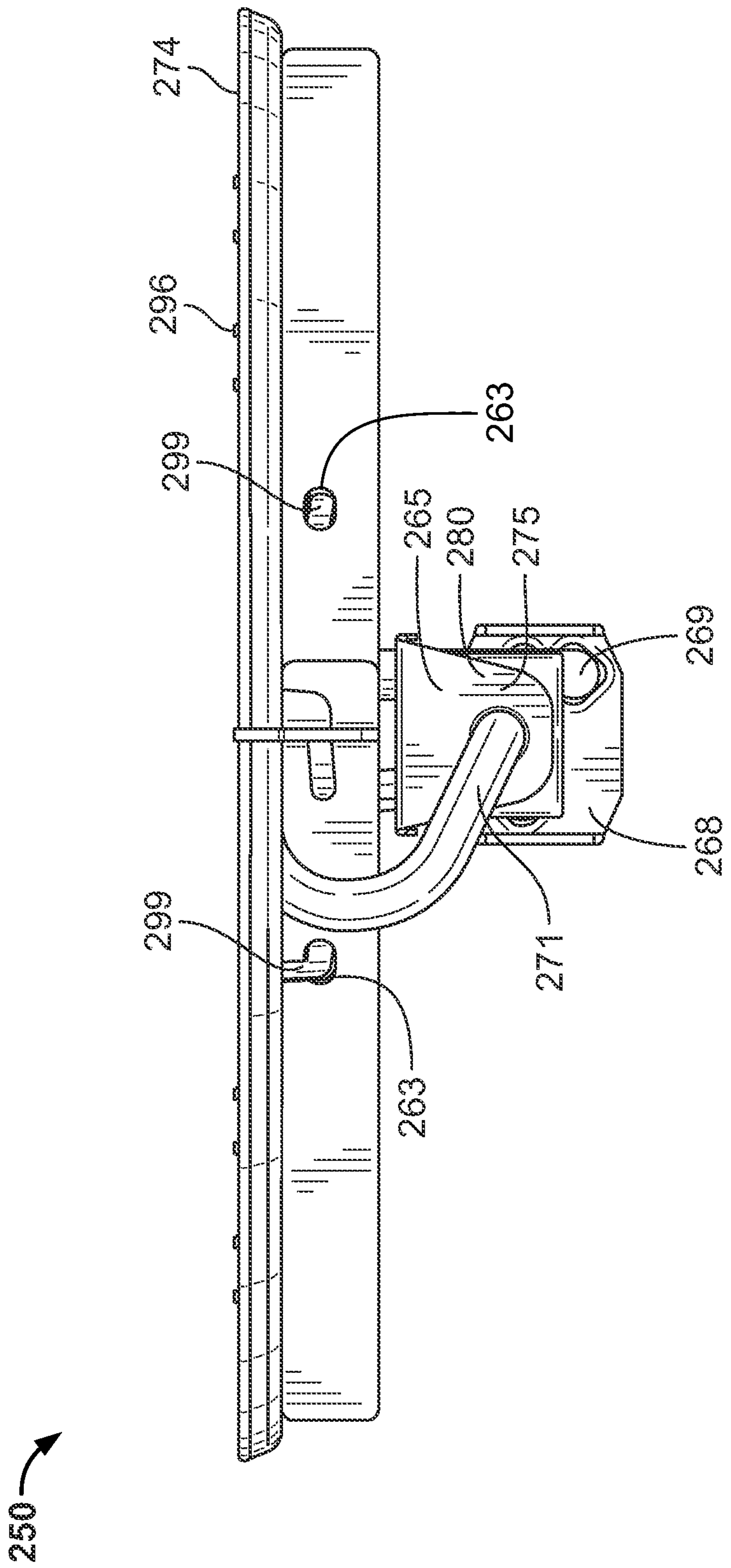
FIG. 3 is a rear elevation view thereof.
Figure 4:
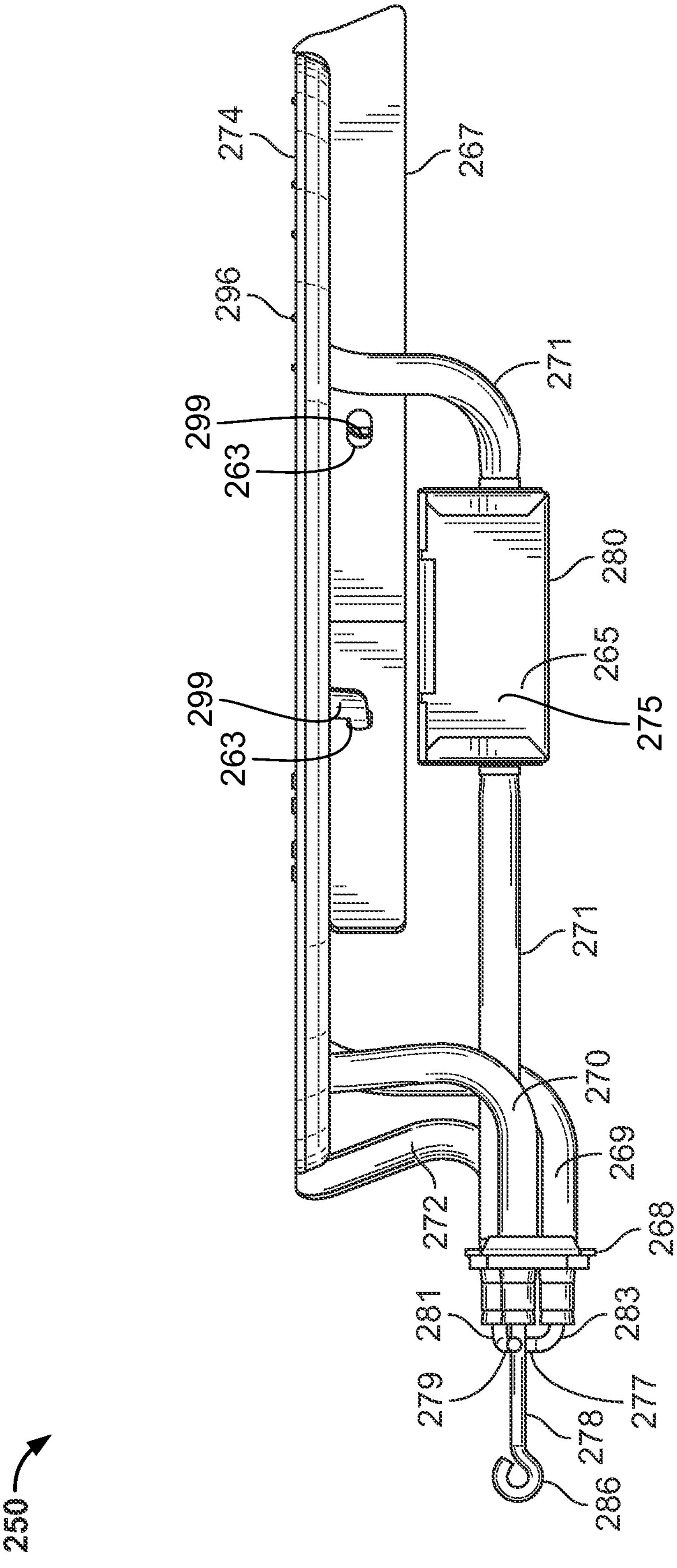
FIG. 4 is a right side elevation view thereof.
Figure 5:
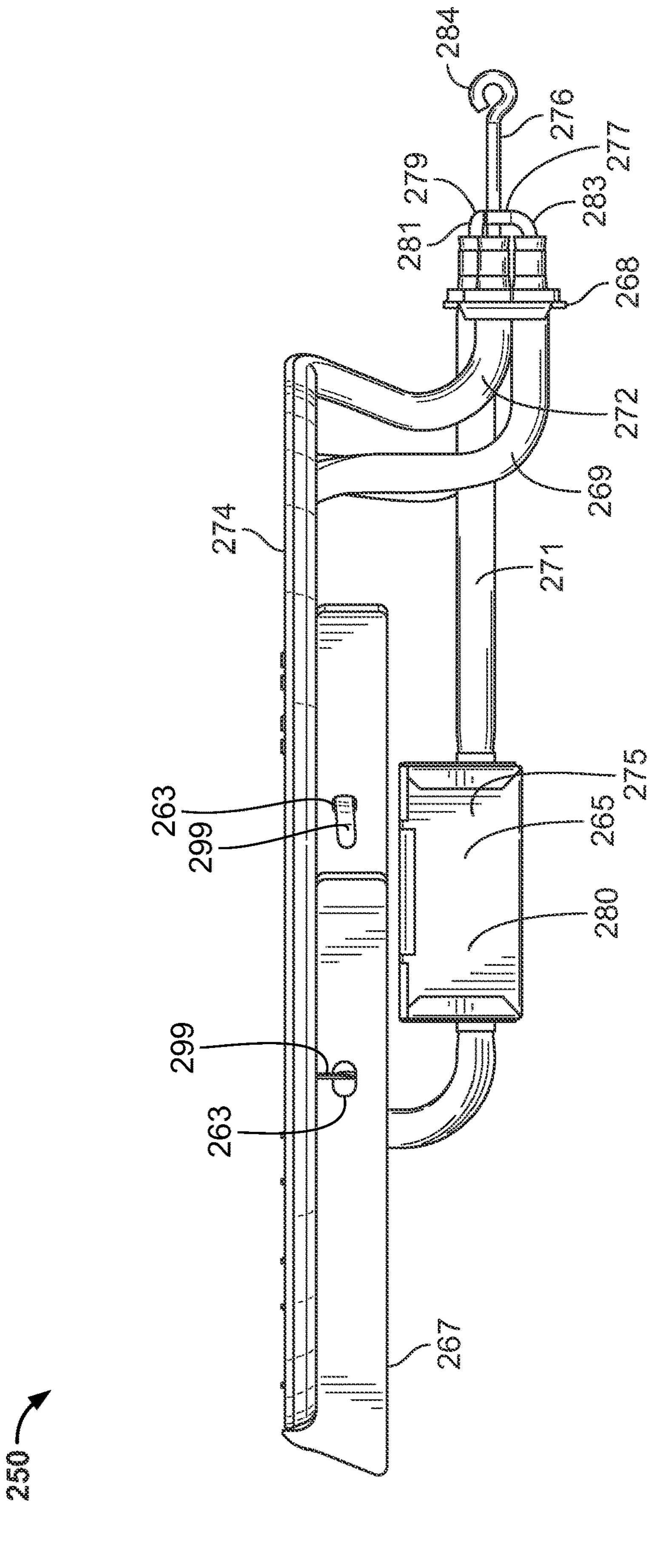
FIG. 5 is a left side elevation view thereof.

As shown in the figures, the end portions of cold legs 269,270,271,272 are arranged in close proximity to one another to form a compact arrangement from which a pair of terminals 284,286 extend generally parallel to one another for connecting to an electrical power source. More specifically, as shown in FIG. 2, the end portion of cold leg 269 of inner heating element 260 is positioned generally beneath the end portion of cold leg 272 of outer heating element 262. As shown in FIG. 2, to more centrally position temperature sensor 265 and provide maximum side-to-side (i.e., lateral) and vertical clearance with a drip pan that could be positioned underneath electric heating element 250, the end portion of cold leg 271 of inner heating element 260 is positioned between the end portion of cold leg 270 of outer heating element 262 and the end portion of cold leg 272 of outer heating element 262. In addition, to provide maximum top-to-bottom clearance with a drip pan while managing the proximity of temperature sensor 265 to inner heating element 260 and outer heating element 262, end portion of cold leg 271 may be positioned slightly higher than end portions of cold legs 272,270, as shown in FIG. 2. In the embodiments shown in the figures, temperature sensor 265 is positioned underneath medallion 266 and underneath spider bracket 267, and the geometric center of the temperature sensor 265 lies along an axis that extends through the geometric center of the medallion 266 and the spider bracket 267 to provide maximum side-to-side and vertical clearance with a drip pan and to provide radiant shielding by medallion 266, which also serves as decorative ornamentation at the center of electric heating element 250.

To connect electric heating element 250 to an electrical power source, inner heating element 260 includes electrical terminals 281,283 extending from respective end portions of cold legs 271,269, and outer heating element 262 includes electrical terminals 284,286 extending from respective end portions of cold legs 272,270. As shown in FIG. 1, terminal 281 is connected to terminal 286 and terminal 283 is connected to terminal 284. In this embodiment, the electrical conductor 279 of terminal 281 turns or is bent towards, and is joined by brazing or soldering to or otherwise joined with, the electrical conductor 278 of terminal 286 at a location some distance away from the end of terminal 286. The electrical conductor 277 of terminal 283 turns or is bent towards, and is joined by brazing or soldering to or otherwise joined with, the electrical conductor 276 of terminal 284 at a location some distance away from the end of terminal 284. In other embodiments, terminals 281 and 283 may be jumpered to terminals 286 and 284, respectively. Positioning and connecting the conductors 277 and 279 to conductors 276 and 278, respectively, allows for direct connection of terminals 284 and 286 to an electrical power source on a conventional two-terminal receptacle stovetop, cooktop, or range appliance without requiring a 4 terminal-to-2-terminal adaptor or an appliance with 4 terminal receptacles. In addition, positioning and connecting the conductors 277 and 279 to conductors 276 and 278, respectively, effectively wires inner heating element 260 and outer heating element in parallel, which allows selective operation of the inner heating element 260 and/or outer heating element 262 as discussed more fully below.

Terminal bracket 268 supports respective cold legs 269, 270,271,272 and is configured to stabilize the inner and outer heating elements 260,262 relative to one another. Terminal bracket 268 may be positioned somewhat near the terminal end of cold legs 269,270,271,272 along the sheathed portion of cold legs 269,270,271,272. Terminal bracket 268 may include apertures, cutouts, grooves, straps, or other similar features to maintain position of each respective cold leg 269,270,271,272 relative to one another while supporting each of the cold legs 269,270,271,272 in space. Terminal bracket 268 may be configured to have a close fit or an interference fit with the outer perimeter of the cold legs 269,270,271,272.

In the embodiment shown in the figures, the terminal end 287 of the cold legs 269,270,271,272 nearest terminals 284,286 may be slightly tapered to allow the terminal bracket 268 to slide onto and wedge against the cold legs 269,270,271,272 during assembly. The apertures in the terminal bracket 268 may be sized to snuggly fit the diameter along any portion of cold legs 269,270,271,272 near the terminal end. In other embodiments, the geometry and/or manner of securing terminal bracket 268 to cold legs 269, 270,271,272 may be different without departing from the scope of the instant disclosure. Cold legs 269,270,271,272 may be brazed or welded to terminal bracket 268. Terminal bracket 268 may be crimped to each of the cold legs 269,270,271,272.

Cold legs 269,270,271,272 may be configured with conductors 276,278,277,279 covered with silicone insulation 282, which is covered by sheath 285. To transition cold legs 269,270,271,272 to the heated portions of inner heating element 260 and outer heating element 262, conductors 276,278,277,279 may be connected, such as by welding, to electrically resistive wire that lies coiled inside a densely packed volume of magnesium oxide powder, all of which is covered by sheath 285.

Terminal bracket 268 may be configured from an electrically conductive material, such as a metal. Terminal bracket 268 may be configured from a thermally resistant material. Terminal bracket 268 may be used to electrically ground electric heating element 250. Terminal bracket 268 may be formed from a stamping, a forging, a casting, a machined article, a 3-D printed article, or any other suitable manufacturing method.

Spider bracket 267 is configured to support coiled portions 273,274 of the respective inner and outer heating elements 260,262 relative to one another. Spider bracket 267 is also configured to support medallion 266. Spider bracket 267 may be configured with three radially outwardly extending legs arranged at approximately equal angles with respect to one another from a central location, as shown in the figures, or in any other quantity of legs, shape or configuration to support the inner and outer heating elements 260,262. Spider bracket 267 may include upwardly extending protrusions 296 on each leg so as to restrain and/or help maintain position of one or more portions of coiled portions 273,274 relative to spider bracket 267. In other embodiments, spider bracket 267 may include recessed receptacles formed in each leg to accomplish this purpose.

Medallion 266 may be generally circular-shaped when viewed from the top (see, e.g., FIG. 6) and may be made from a sheet metal formed in the configuration shown in the figures. Medallion 266 includes top wall 297, tubular skirt 298 extending downwardly from the outer perimeter of top wall 297, and a plurality of "L" shaped tabs 299, each of which extending initially downwardly from the skirt 298 and then extending horizontally clockwise (when viewed from the top) for interlocking with a respective aperture 263 in each leg of spider bracket 267 (see, e.g., FIG. 10). One or more of the "L" shaped tabs 299 may be crimped, bent, or otherwise deformed after passing through respective apertures 263 to affix and retain medallion 266 to spider bracket 267. In other embodiments, medallion 266 may have any geometrical shape when viewed from the top and may be made from any material or have any thickness that is appropriate for the heating environment to which it is exposed. In addition, medallion 266 may be attached to spider bracket 267 differently than as shown in the figures by, for example, engaging skirt 298 with angled slots in each of the legs of spider bracket 267.

Heating elements 260,262 may include a tubular sheathed configuration. The cross sectional profile of heating elements 260,262 may include a generally trapezoidal shape with a flat top surface, downwardly sloped and opposed side walls, and a curved bottom wall positioned opposite the flat top surface and joined to the opposed side walls. A relatively small transitional radius may exist between each of the side walls and the top flat surface. In other embodiments, the cross sectional profile of heating elements 260,262 may have any shape.

One or more temperature sensors 265 may be connected to or in relevant proximity to either or both of heating elements 260,262 for sensing: (1) the temperature of a cooking utensil positioned on the top flat surface of heating elements 260,262, (2) the temperature of a desired location along either or both of heating elements 260,262, and/or (3) the temperature of a desired one or more zones or regions in or near either or both of heating elements 260,262. To minimize erroneous temperature readings and damage from excessive exposure to heat generated from heating elements 260,262 and/or liquids associated with items to be cooked in the utensil, the one or more temperature sensors 265 may be positioned along cold leg 271 of inner heating element 260, as shown in FIGS. 1-13, for maximum clearance between housing 280 and a drip pan positioned in proximity with electric heating element 250. The one or more temperature sensors 265 may include, be configured as, or be connected to one or more thermocouples, one or more thermistors, one or more electrical and/or electromechanical switches 242 (see, e.g., FIG. 14-15), or one or more relatively small thermostats comprising a relatively small bimetal material that acts as an electrical switch and which quickly responds to changes in temperature to open or close the electrical circuit for improved cooking performance.

In some embodiments, by positioning a temperature sensor 265 along cold leg 271 of inner heating element 260, selective on/off control of the coiled portion 273 of inner heating element 260 while maintaining continuous heating of the outer heating element 262 improves cooking performance while minimizing overcooking. For example, as shown in FIGS. 1-13, the one or more temperature sensors 265 are configured as a single bimetal thermostat 275 positioned along a cold leg, such as cold leg 271 (as shown, for example, in FIG. 10). The thermostat 275 may selectively control delivery of electrical current to inner heating element 260 upon detecting a predetermined upper temperature and a predetermined lower temperature. The bimetal material of thermostat 275 may be configured to open an electrical circuit upon detecting a desired, predetermined upper temperature thereby shutting off power to inner heating element 260. In one embodiment, when a thermostat 275 is positioned along cold leg 271, electrical current to coiled portion 273 of inner heating element 260 is ceased when the bimetal material of the thermostat 275 opens the circuit while electrical current to coiled portion 274 of outer heating element 262 continues at its maximum or other desired setting. As illustrated in the figures, inner heating element 260 is wired in parallel with outer heating element 262 to allow coiled portion 274 of outer heating element 262 to remain electrically energized when electrical current to coiled portion 273 of inner heating element 260 is ceased.

Alternatively, instead of continuously energizing coiled portion 274 of outer heating element 262 while selectively energizing coiled portion 273 of inner heating element 260, the parallel wiring of the inner heating element 260 with the outer heating element 262 allows the option of continuously energizing coiled portion 273 while selectively energizing coiled portion 274 if a switch or thermostat is positioned along, for example, cold leg 270 or 272 of outer heating element 262. For example, depending on available space and size of the thermostat and/or thermostat housing (if any), a thermostat 275 may be positioned along a cold leg of the outer heating element 262, such as cold leg 270 to provide selective on/off control of coiled portion 274 of outer heating element 262 while maintaining continuous heating of coiled portion 273 of inner heating element 260. In embodiments when a thermostat 275 is positioned along cold leg 270, for example, electrical current to the coiled portion 274 of outer heating element 262 is ceased when the bimetal material of the thermostat 275 opens the circuit while electrical current to coiled portion 273 of inner heating element 260 continues at its maximum or other desired setting.

Upon ceasing the flow of electrical current, the inner heating element 260 (or the outer heating element 262 as the case may be) and the bimetal material of the thermostat 275 will tend to cool due to reduced heat being generated from electric heating element 250. When the bimetal material of the thermostat 275 is cooled to a desired, predetermined temperature, the thermostat 275 may "reset" by closing the circuit to allow electricity to flow again to the inner heating element 260. How quickly the thermostat 275 resets and the modulation of heat radiating from electric heating element 250 may be a function of various factors, including the thermostat size, the configuration and extent of thermostat shielding (e.g., from the housing described below), protective barriers or coatings applied to internal or external surfaces to, for example, thermal shielding (e.g., coating or lining a thermostat housing with a reflective or a nonreflective material or a colored paint), and relative position of the thermostat 275 with respect to the radiant heat generated from the inner heating element 260 and the outer heating element 262 and/or the cooking utensil. Some embodiments may include a paint or a coating applied to a surface of the thermostat or to a surface of the enclosure that houses the thermostat, such as housing 280, to control the amount or the rate of exposure of the thermostat 275 to heat from the inner heating element 260 and/or the outer heating element 262.

Figure 14:
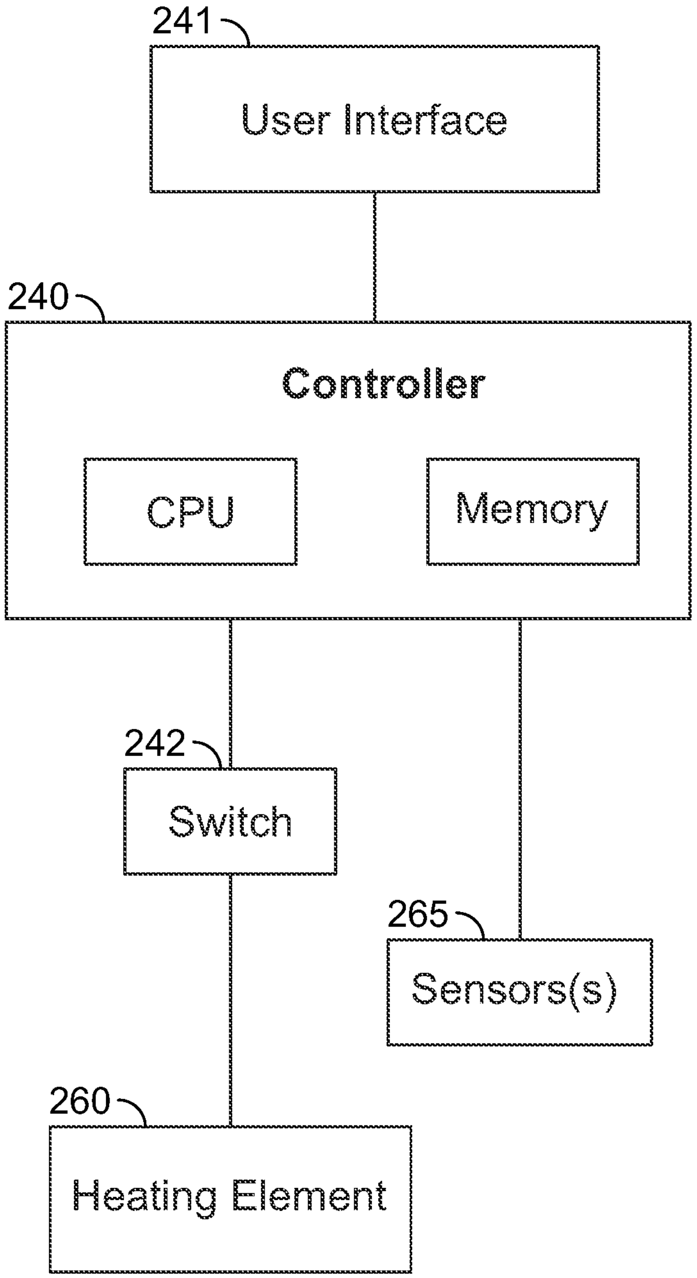
FIG. 14 is a schematic of a control system of the instant disclosure.
Figure 15:
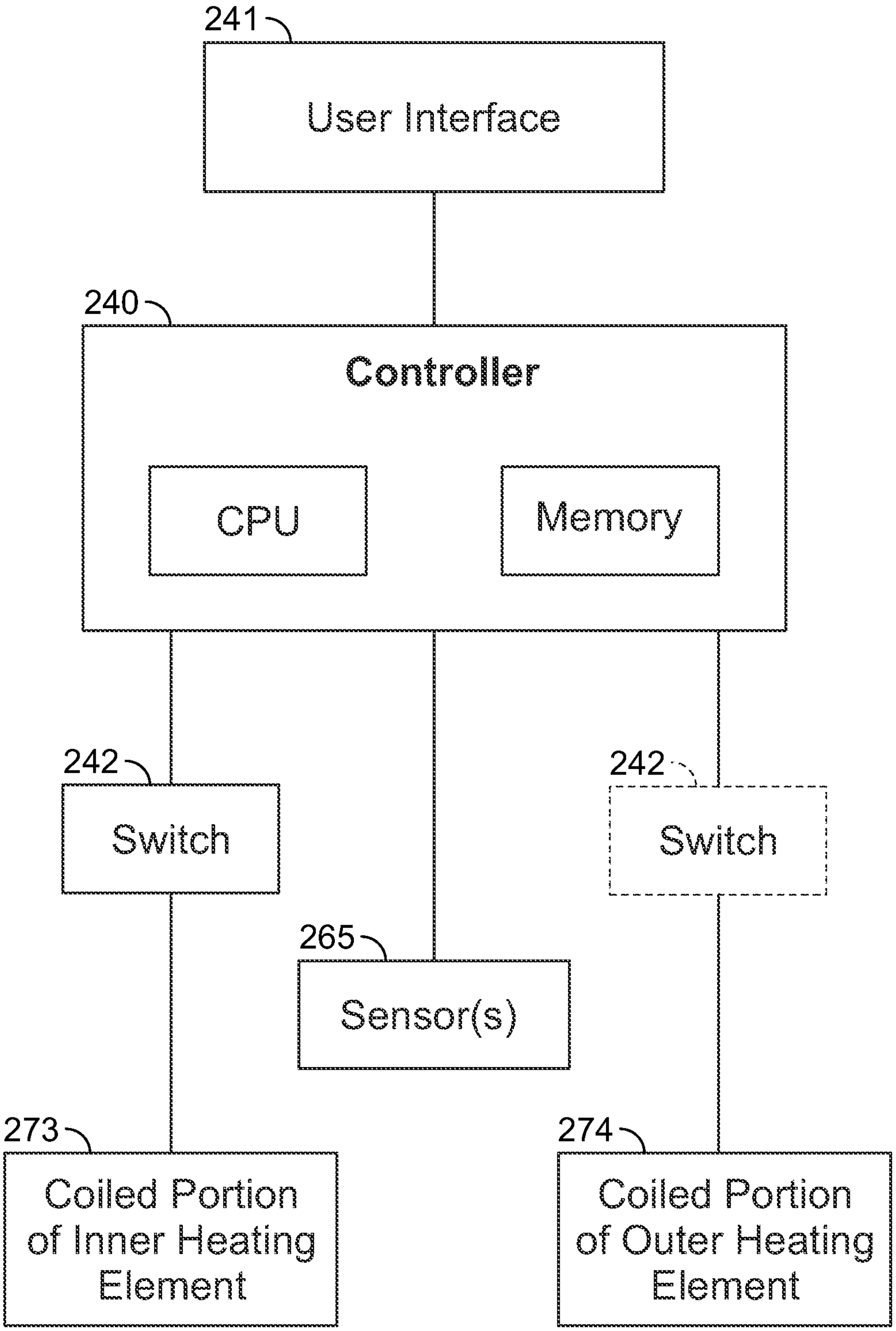
FIG. 15 is schematic of another control system of the instant disclosure.

In other embodiments, the one or more temperature sensors 265 may include or be coupled directly or indirectly to one or more electrical switches, such as one or more switches 242, to turn on and/or turn off electrical current to a designated inner heating element 260 or outer heating element 262 or both. For example, as shown in control schematics FIGS. 14-15, instead of thermostat 275, an electrical switch 242 may be positioned along, for example, cold leg 271 that is responsive to commands from controller 240 to open or close the electrical circuit for inner heating element 260 (while outer heating element 262 remains energized due to the parallel wiring arrangement described above) in response to upper and/or lower temperatures detected by one or more temperature sensors 265 connected to or in relevant proximity to either or both of heating elements 260,262. As shown in FIG. 15, another electrical switch 242 may optionally be positioned along, for example, cold leg 270 that is responsive to commands from controller 240 to open or close the electrical circuit for outer heating element 262 (while inner heating element 260 remains energized due to the parallel wiring arrangement described above) in response to upper and/or lower temperatures detected by one or more temperature sensors 265 connected to or in relevant proximity to either or both of heating elements 260,262.

Controller 240 may include and/or be connected to one or more CPU's, memory, data buses, switches, sensors, displays, user interfaces, and software configured to respond to and/or carry out computer commands. In some embodiments, controller 240 may be positioned some distance away from electric heating element 250 to minimize exposure to heat and to maximize endurance and functionality of the components of controller 240.

Electric heating element 250 may be controlled via conventional user commands, such as by a user interface including, for example, an analog, digital or virtual dial, knob, button, or device. As shown in FIGS. 14-15, a user interface 241 may be coupled to controller 240. User interface 241 may be configured to receive user-selectable heat output settings corresponding to desired heat output from electric heating element 250. User interface 241 may include a digital user interface comprising an interactive display, such as a touch sensitive display, that is connected to controller 240 to receive and process user heat setting inputs. In other embodiments, user interface 241 may be configured as a manually operable rheostat to receive user-selectable heat output settings and to provide a desired amount of electrical current to electric heating element 250 without the need for controller 240.

If the user-selectable heat output setting received from user interface 241 is anything other than an "off" or unpowered setting, upon receiving a signal and/or sensor data from the one or more temperature sensors 265 that meet or exceed a predetermined upper or lower threshold, the controller 240 may command the one or more switches 242 to open and/or close to turn on and/or turn off electrical current to a designated inner heating element 260 or outer heating element 262 or both. The signal and/or sensor data may be a sensed temperature or interpreted as a sensed temperature by the controller 240. In some embodiments, the microprocessor of controller 240 may be programmed to command the one or more switches 242 to open and/or close to turn on and/or turn off electrical current to a designated inner heating element 260 or an outer heating element 262 or both irrespective of any sensor data received from the one or more temperature sensors 265. The controller 240 may be configured to interpret temperature gradients sensed or measured over a period of time. The controller 240 may be configured to open and/or close the switch in advance of actually reaching a predetermined temperature according to the temperature gradient to ensure, for example, a predetermined maximum temperature of the cooking utensil and/or to ensure maintaining an optimum mean operating temperature of electric heating element 250 according to the item being heated or cooked thereon. In some embodiments, in response to sensor data received from the one or more temperature sensors 265, controller 240 may be configured to dynamically modulate the flow of electrical current to, and thus heat output from, a designated inner heating element 260 or outer heating element 262 or both.

The controller 240 may include preprogrammed logic to automatically control the temperature of the cooking utensil and/or the item being heated or cooked therein after the user sets the heating element 250 via user interface 241 to its maximum "on" position thereby energizing both coiled portions 273,274. The controller 240 may be programmed to selectively control delivery of electrical current to heating element 250. For example, in some embodiments, electrical current to the coiled portion 273 of inner heating element 260 is ceased while electrical current to the coiled portion 274 of outer heating element 262 continues at its maximum setting. In other embodiments, electrical current to coiled portion 274 of outer heating element 262 is ceased while electrical current to the coiled portion 273 of inner heating element 260 continues at its maximum setting.

In various embodiments, when a predetermined temperature of the cooking utensil is reached, as sensed by the one or more temperature sensors 265 and/or interpreted by the controller 240, the controller 240 may command the switch 242 to open to cease the flow of electrical current to one of coiled portion 273 or coiled portion 274 for a predetermined period of time, until a predetermined change in temperature is sensed by the one or more temperature sensors 265, or until a predetermined lower temperature is sensed by the one or more temperature sensors 265.

When either the predetermined period of time has elapsed, the predetermined change in temperature is sensed, or the predetermined lower temperature is sensed, the controller 240 may command the switch 242 to close so to reinstate the flow of electrical current to the coiled portion 273 or 274 that was earlier ceased. The time at which the controller 240, via the switch 242, turns off the flow of electrical current and reinstates the flow of electrical current to an affected coiled portion 273,274 may be affected by how quickly the change in temperature of the cooking utensil reaches the one or more temperature sensors 265 that results from the change in electrical current. Factors that may influence the timing for opening and closing the switch include the proximity of the one or more temperature sensors 265 to the cooking utensil and whether a thermal insulator or a thermal conductor or both is positioned between the one or more temperature sensors 265 and the cooking utensil. The timing may be calibrated to account for these and other factors to maximize the performance of the heating element 250.

In other embodiments, controller 240 may be configured to receive temperature data from one or more temperature sensors 265 positioned on or in proximity to the inner heating element 260 and/or the outer heating element 262. One or more transistors may be positioned along one or more cold legs of one both of the inner and outer heating elements 260,262 to modulate the electrical current passed through the designated cold leg to, in turn, modulate the heat output from the designated coiled portion 273,274. For example, in various embodiments, instead of using a switch 242 or a thermostat as discussed above, cold leg 271 may instead include a transistor controlled by controller 240 to control the current flowing through cold leg 271 to coiled portion 273. When a desired temperature of the cooking utensil (or any desired region near the cooking utensil or inner and outer heating elements 260,262) is reached, as sensed by the one or more temperature sensors 265 and processed by the controller 240, the controller 240 may, in turn, provide a signal to a transistor or a throttle circuit to modulate or throttle the flow of electrical current to coiled portion 273 while outer heating element 262 continues to be energized at any controlled setting. In other embodiments, the controller 240 can be programmed to simultaneously modulate or throttle either or both of the inner heating element 260 and the outer heating element 262 via one or more transistors positioned along respective cold legs to achieve a desired heat output from electric heating element 250.

Figure 10:
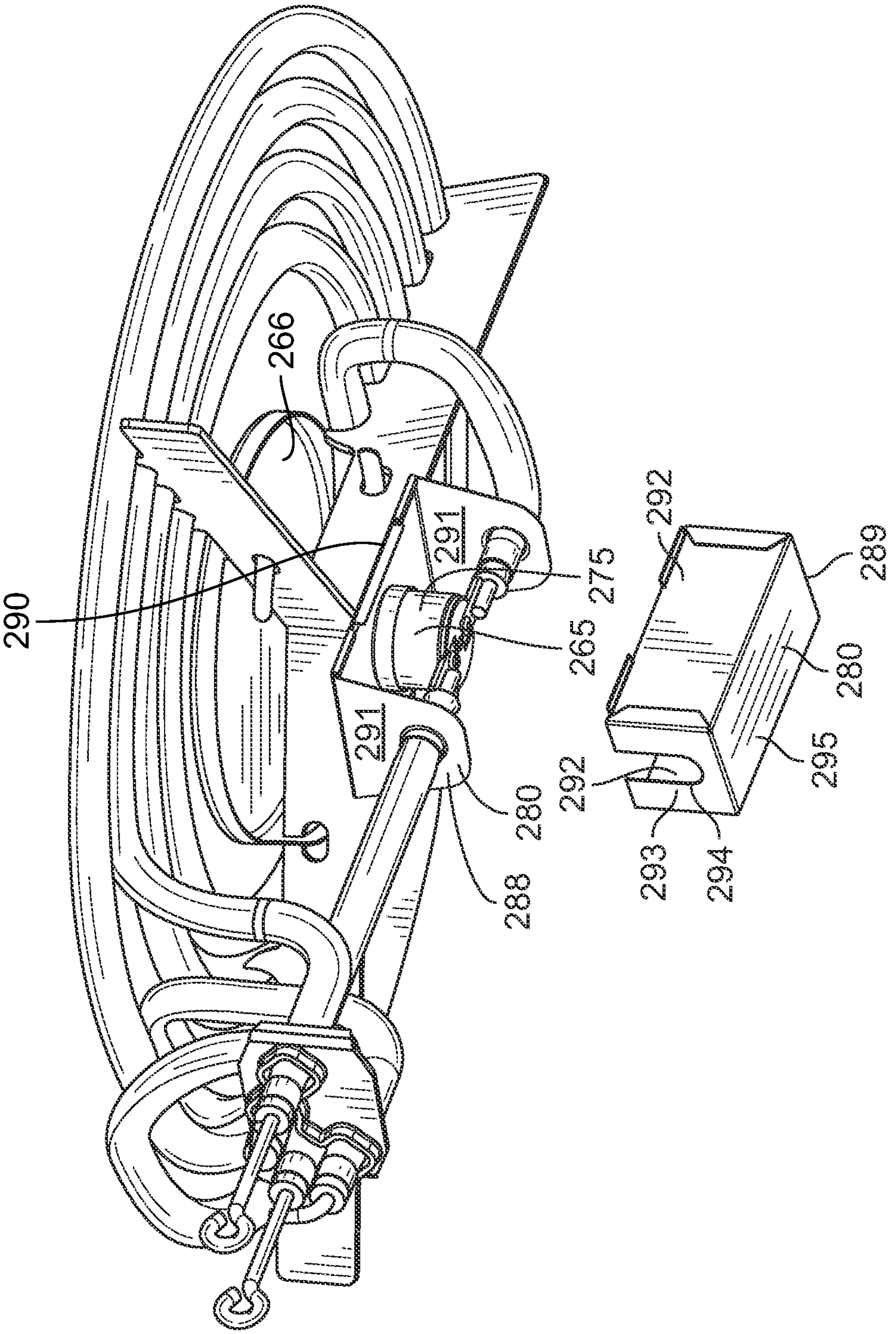
FIG. 10 is a partially exploded, front, bottom perspective view thereof.
Figure 11:
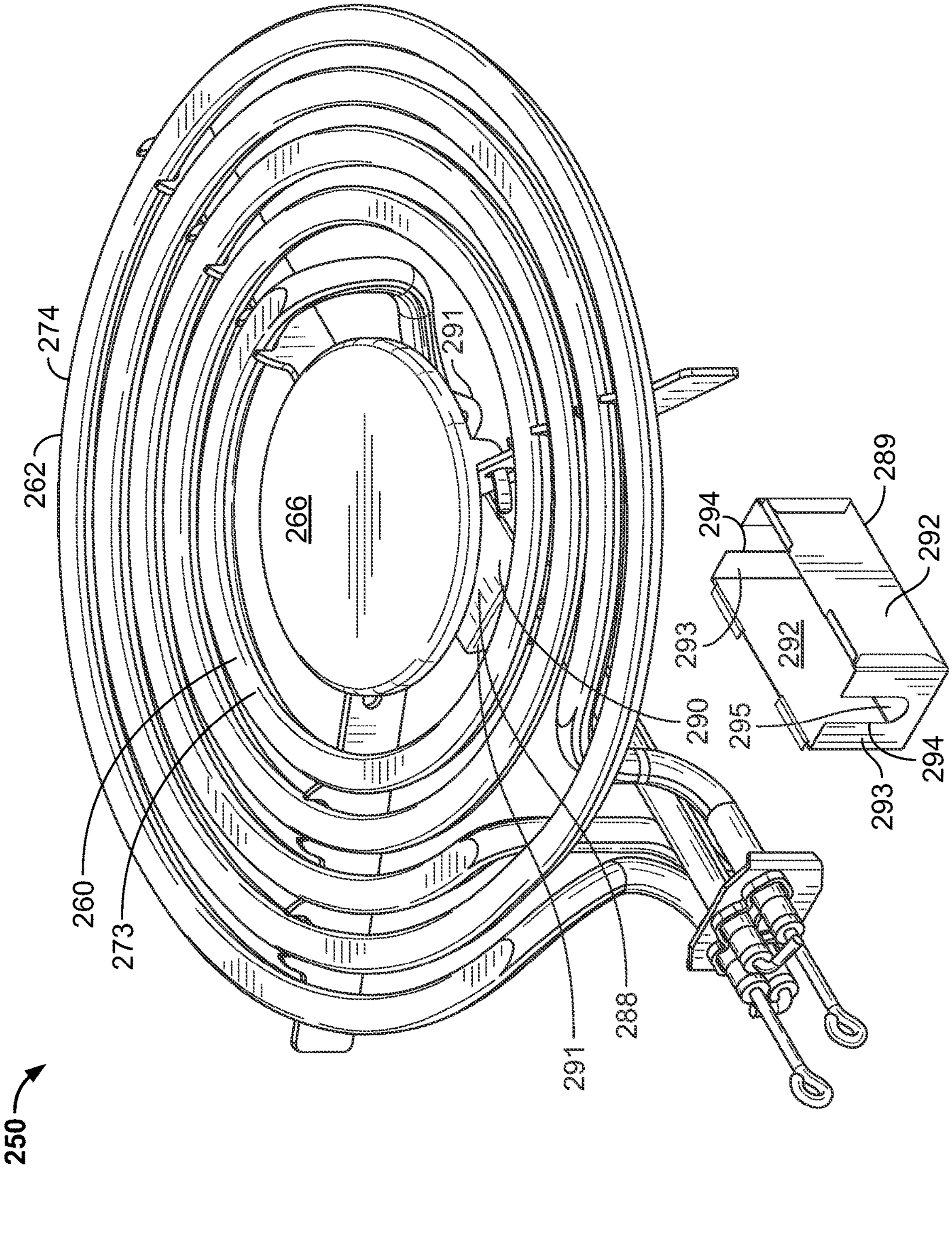
FIG. 11 is a partially exploded, front, top perspective view thereof.
Figure 12:
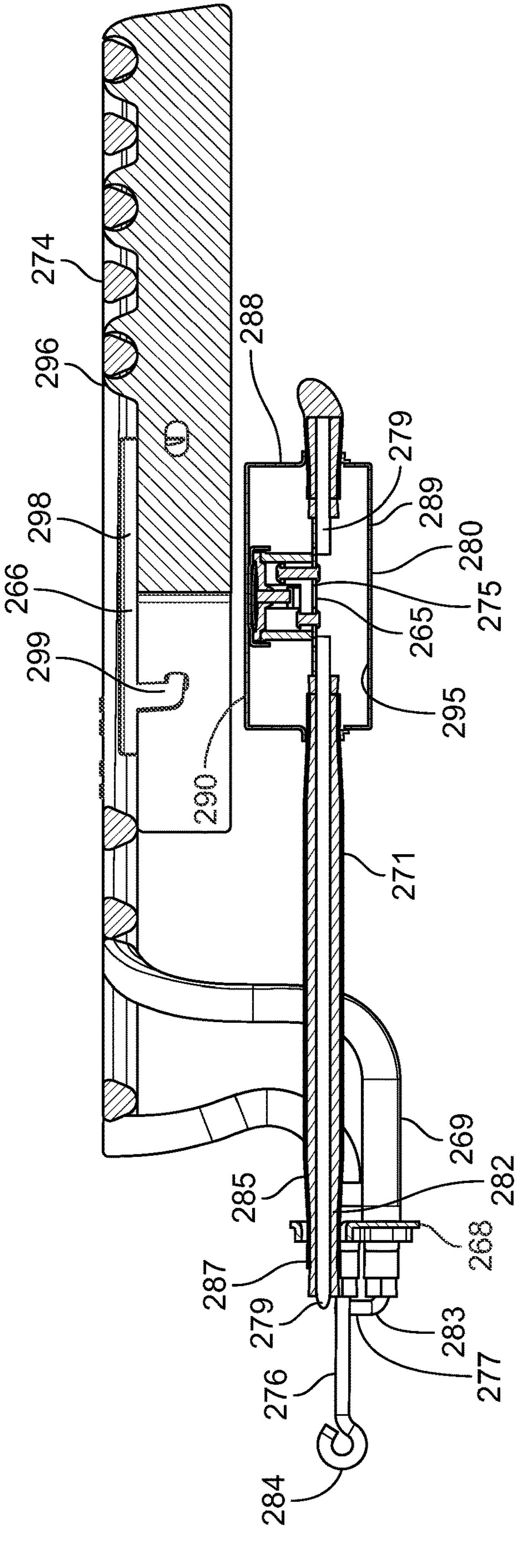
FIG. 12 is a cross section view thereof.
Figure 13:
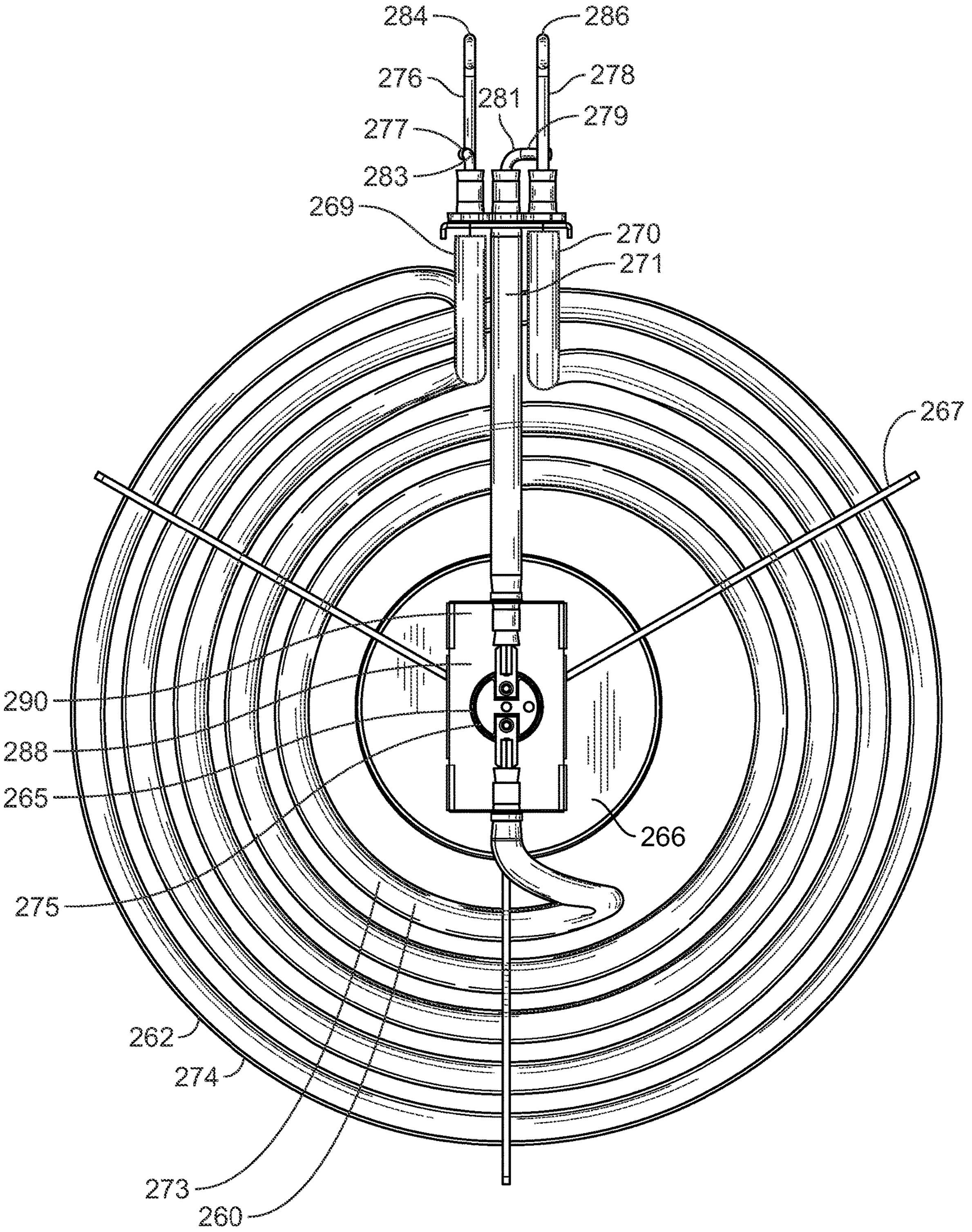
FIG. 13 is a bottom plan view thereof with a portion removed for clarity.

Turning again to FIGS. 1-13, electric heating element 250 may include a protective housing 280 for housing and protecting the one or more temperature sensors 265 from dust, debris, food, liquids, and excessive or undesirable temperatures, and for enabling optimum performance of the one or more temperature sensors 265 in a smaller package. Housing 280 may be configured with a top portion 288 and a bottom portion 289 that when brought together form housing 280. As best shown in FIG. 10, top portion 288 may include a top wall 290 and two opposed end walls 291, all formed from sheet metal in this embodiment. In other embodiments, housing 280 may be made from other heat resistant material(s). Each of the two opposed end walls 291 include an aperture sized to snugly fit opposing ends of cold leg 271 therethrough, which opposing ends may be tapered to assist assembly. As shown in the embodiment of FIG. 12, temperature sensor 265 comprising a bimetal thermostat 275 is positioned with its bimetal disc in close proximity to top wall 290. The cover of the thermostat 275 may be connected to top wall 290 by, for example, spot welding the thermostat cover to the top wall 290. Bottom portion 289 may include a bottom wall 295, two opposed side walls 292, and two opposed end walls 293. As shown in the embodiment of FIG. 11, each of the two opposed end walls 293 include a slot 294 to slide over opposing ends of cold leg 271. Respective end walls 293 of bottom portion 289 are configured to lie adjacent to respective end walls 291 of top portion 288. When positioned adjacently together, such as in a nested fashion, top portion 288 and bottom portion 289 may be welded or otherwise joined together.

In some embodiments, the one or more temperature sensors 265 may be housed in the same housing as switch 242, such as housing 280. In other embodiments, switch 242 may be positioned away from housing 280, such as somewhere in or on the appliance (e.g., stove) itself. Similarly, controller 240 may be positioned away from heat generated by electric heating element 250, such as somewhere in or on the appliance (e.g., stove) itself.

As discussed above, in the embodiment of FIGS. 1-13, the one or more temperature sensors 265 and its protective housing 280 are positioned along cold leg 271 in proximity to but underneath coiled portions 273,274, underneath medallion 266, and underneath spider bracket 267, and the geometric center of the temperature sensor 265 lies along an axis that extends through the geometric center of the medallion 266 and the spider bracket 267 to provide maximum side-to-side and vertical clearance with a drip pan and to provide radiant shielding by medallion 266, which also serves as decorative ornamentation at the center of electric heating element 250. A first end of cold leg 271 extends from the housing 280 and terminates at terminal 286 via terminal 281 and conductors 279,278. A second end of cold leg 271 extends from housing 280 toward the rear of the electric heating element 250 and below spider bracket 267. The second end turns upwardly a short distance after exiting housing 280 and then turns horizontally and around medallion 266 to transition to coiled portion 273 of inner heating element 260. As described above, the one or more temperature sensors 265, whether or not housed in an enclosure, such as housing 280, may be positioned above the drip pan that may be positioned under electric heating element 250 on a stovetop or similar appliance.

Any of the features described with reference to FIGS. 1-15 may be combined into a single embodiment, even if not simultaneously shown in a single drawing figure. In addition, one of ordinary skill would appreciate that the teachings of the instant disclosure include electric heating elements with more than two heating coils.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

The invention claimed is:

1. An electric heating element, comprising:

an electrically resistive inner heating element including an inner coiled heating portion and first and second cold legs extending from and underneath the inner coiled heating portion for connection to an electrical power source;

an electrically resistive outer heating element including an outer coiled heating portion positioned in a common plane with and around the inner coiled heating portion, the inner and outer coiled heating portions defining a working surface for receiving a cooking utensil thereon, the outer heating element including third and fourth cold legs extending from and underneath the outer coiled heating portion for connection to the electrical power source, wherein the third cold leg is positioned adjacent to and directly above the first cold leg and the second cold leg is positioned between the third and fourth cold legs, and the inner heating element is electrically wired in parallel with the outer heating element, wherein first and second conductors extending from the respective first and second cold legs are electrically joined with respective third and fourth electrical conductors extending from the respective third and fourth electrical conductors, wherein the third and fourth electrical conductors are configured for engaging with an appliance electrical receptacle having a single pair of electrical conductor receiving ports; and a switch positioned in proximity to the common plane and inside the inner coiled heating portion, the switch positioned in electrical series along the second cold leg, the switch configured to selectively open and close an electrical circuit to turn off and on the inner coiled heating portion.

2. The electric heating element of claim 1, wherein the switch is a thermostat that includes a bimetal material configured to: (a) open the electrical circuit upon detecting a predetermined high temperature associated with heat emitted from the inner heating element and/or the outer heating element, and (b) close the electrical circuit upon detecting a predetermined low temperature associated with heat emitted from the outer heating element.

3. The electric heating element of claim 1, including an enclosure for housing the switch.

4. The electric heating element of claim 3 wherein the enclosure comprises a stainless steel.

5. The electric heating element of claim 3, wherein the enclosure includes a top portion and a bottom portion, wherein the top portion includes opposed end walls extending downwardly from a top wall, and the bottom portion includes opposed, slotted end walls and opposed side walls extending upwardly from a bottom wall, wherein each of the opposed, slotted end walls of the bottom portion are configured to lie adjacent to the respective opposed end walls of the top portion.

6. The electric heating element of claim 5, wherein the opposed end walls of the top portion each include a circular aperture to receive the second cold leg of the inner coiled heating portion.

7. The electric heating element of claim 5, wherein a top surface of the switch lies against the top wall of the top portion of the enclosure.

8. The electric heating element of claim 1, including a medallion positioned above the switch, the medallion including "L" shaped engagers for rotatably securing the medallion to a heating element support.

9. The electric heating element of claim 1, wherein the third and fourth electrical conductors include respective third and fourth electrical terminals for engaging with the appliance electrical receptacle having the single pair of electrical conductor receiving ports.

10. An electric heating element, comprising:

an electrically resistive inner heating element including an inner coiled heating portion and first and second cold legs extending from the inner coiled heating portion for connection to an electrical power source;

an electrically resistive outer heating element including an outer coiled heating portion positioned in a common plane with and around the inner coiled heating portion, the inner and outer coiled heating portions defining a working surface for receiving a cooking utensil thereon, the outer heating element including third and fourth cold legs extending from the outer coiled heating portion for connection to the electrical power source, wherein the first, second, third and fourth cold legs are under the common plane and extend radially past an outer diameter of the outer coiled heating portion, and the third cold leg is positioned adjacent to and above the first cold leg and the second cold leg is positioned between the third and fourth cold legs;

first, second, third, and fourth electrical conductors extending from the first, second, third and fourth cold legs, respectively, wherein the first electrical conductor is connected to the third electrical conductor and the second electrical conductor is connected to the fourth electrical conductor, wherein the third and fourth electrical conductors are configured for engaging with an appliance electrical receptacle having a single pair of electrical conductor receiving ports; and a thermostat positioned below the working surface and inside the inner coiled heating portion, the thermostat positioned in electrical series along the second cold leg in proximity to the inner coiled heating portion, the thermostat configured to detect an upper predetermined temperature and a lower predetermined temperature and selectively open and close an electrical circuit to cycle off and on the inner coiled heating portion while the outer heating element remains electrically energized.

11. The electric heating element of claim 10, wherein the thermostat includes a bimetal material configured to: (a) open the electrical circuit upon detecting a predetermined high temperature associated with heat emitted from the inner heating element and/or the outer heating element, and (b)

close the electrical circuit upon detecting a predetermined low temperature associated with heat emitted from the outer heating element.

12. The electric heating element of claim 10, including an enclosure for housing the thermostat.

13. The electric heating element of claim 12, wherein the enclosure comprises a stainless steel.

14. The electric heating element of claim 12, wherein the enclosure includes a top portion and a bottom portion, wherein the top portion includes opposed end walls extending downwardly from a top wall, and the bottom portion includes opposed, slotted end walls and opposed side walls extending upwardly from a bottom wall, wherein each of the opposed, slotted end walls of the bottom portion are configured to lie adjacent to the respective opposed end walls of the top portion.

15. The electric heating element of claim 14, wherein the opposed end walls of the top portion each include a circular aperture to receive the second cold leg of the inner coiled heating portion.

16. The electric heating element of claim 14, wherein a top surface of the thermostat lies against the top wall of the top portion of the enclosure.

17. The electric heating element of claim 10, including a multi-legged bracket configured to support the inner and the outer heating elements.

18. The electric heating element of claim 17, including a medallion positioned above the enclosure, the medallion including a plurality of "L" shaped engagers to engage with a respective plurality of receivers to secure the medallion to the bracket.

19. The electric heating element of claim 10, wherein the third and fourth electrical conductors include respective third and fourth electrical terminals for engaging with the appliance electrical receptacle having the single pair of electrical conductor receiving ports.

20. An electric heating element, comprising:

an electrically resistive inner heating element including an inner coiled heating portion and first and second cold legs extending from the inner coiled heating portion for connection to an electrical power source;

an electrically resistive outer heating element including an outer coiled heating portion positioned in a common plane with and around the inner coiled heating portion, the inner and outer coiled heating portions defining a working surface for receiving a cooking utensil thereon, the outer heating element including third and fourth cold legs extending from the outer coiled heating portion for connection to the electrical power source, wherein the first, second, third and fourth cold legs extend under the common plane and radially past an outermost diameter of the outer coiled heating portion, wherein the third cold leg is positioned adjacent to and above the first cold leg and the second cold leg is positioned between the third and fourth cold legs;

first, second, third, and fourth electrical conductors extending from the first, second, third and fourth cold legs, respectively, wherein the first electrical conductor is connected to the third electrical conductor and the second electrical conductor is connected to the fourth electrical conductor, wherein the third and fourth electrical conductors are configured for engaging with an appliance electrical receptacle having a single pair of electrical conductor receiving ports;

a bracket comprising at least three radially extending, spaced apart legs for supporting the inner heating element and the outer heating element;

a thermostat housed in an enclosure, the thermostat positioned in electrical series along the second cold leg under the bracket in proximity to a medallion, the thermostat configured to detect an upper predetermined temperature and a lower predetermined temperature and selectively open and close an electrical circuit to switch on and off the inner coiled heating portion while the outer coiled heating portion remains electrically energized; and a cold leg bracket oriented perpendicularly to the first, second, third, and fourth cold legs and positioned near a terminal end of the first, second, third, and fourth cold legs to restrain the first, second, third, and fourth cold legs near the terminal end.

* * * * *